Oct. 27, 1936.                J. C. DONNELLY                 2,058,573
        MACHINE FOR MAKING AND ASSEMBLING MATCHES AND IGNITION HOLDERS
                    Filed Nov. 22, 1934           17 Sheets-Sheet 1

Inventor
Joseph C. Donnelly
by his Attorney
John J. Nolan

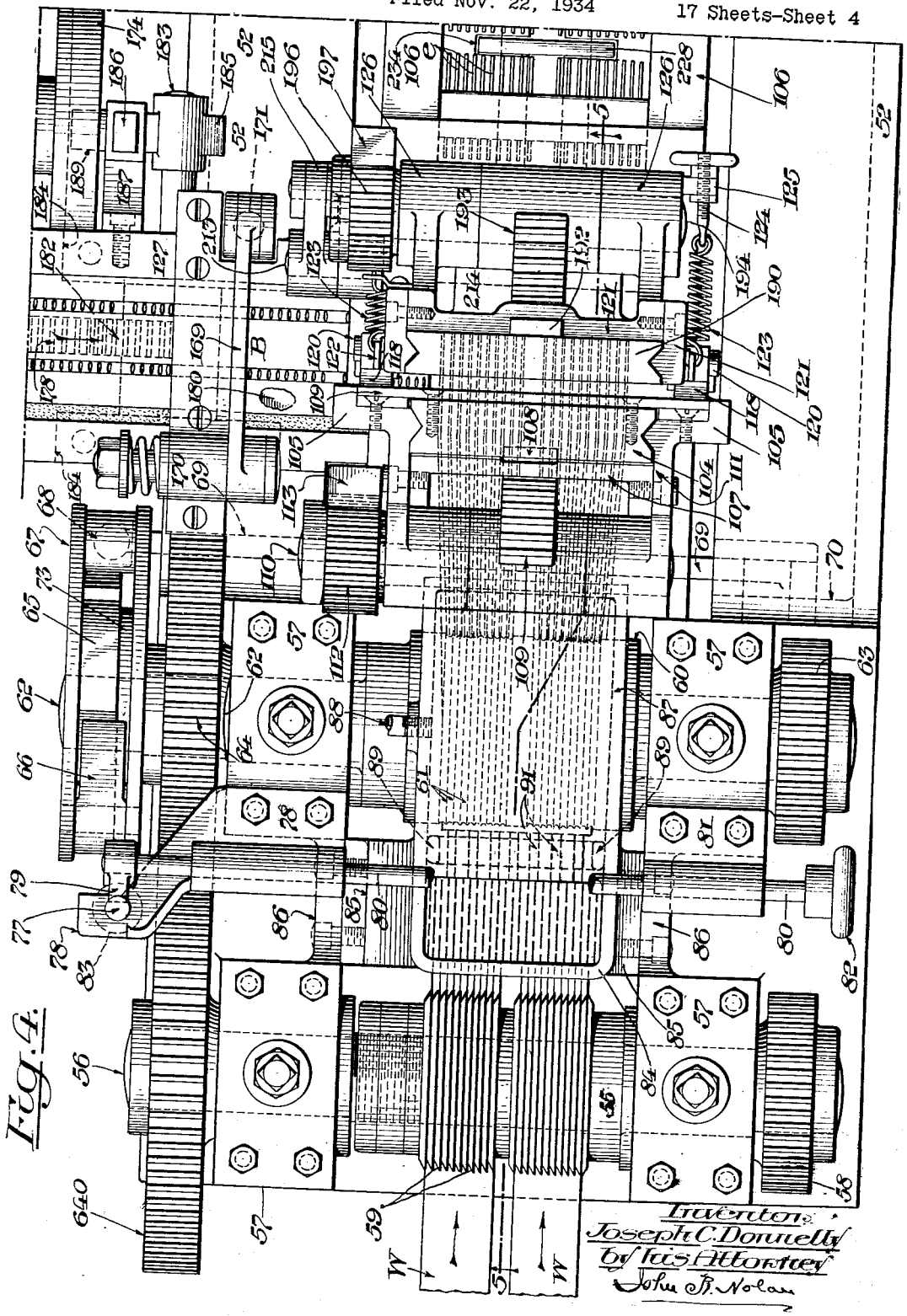

Oct. 27, 1936.   J. C. DONNELLY   2,058,573
MACHINE FOR MAKING AND ASSEMBLING MATCHES AND IGNITION HOLDERS
Filed Nov. 22, 1934   17 Sheets-Sheet 5
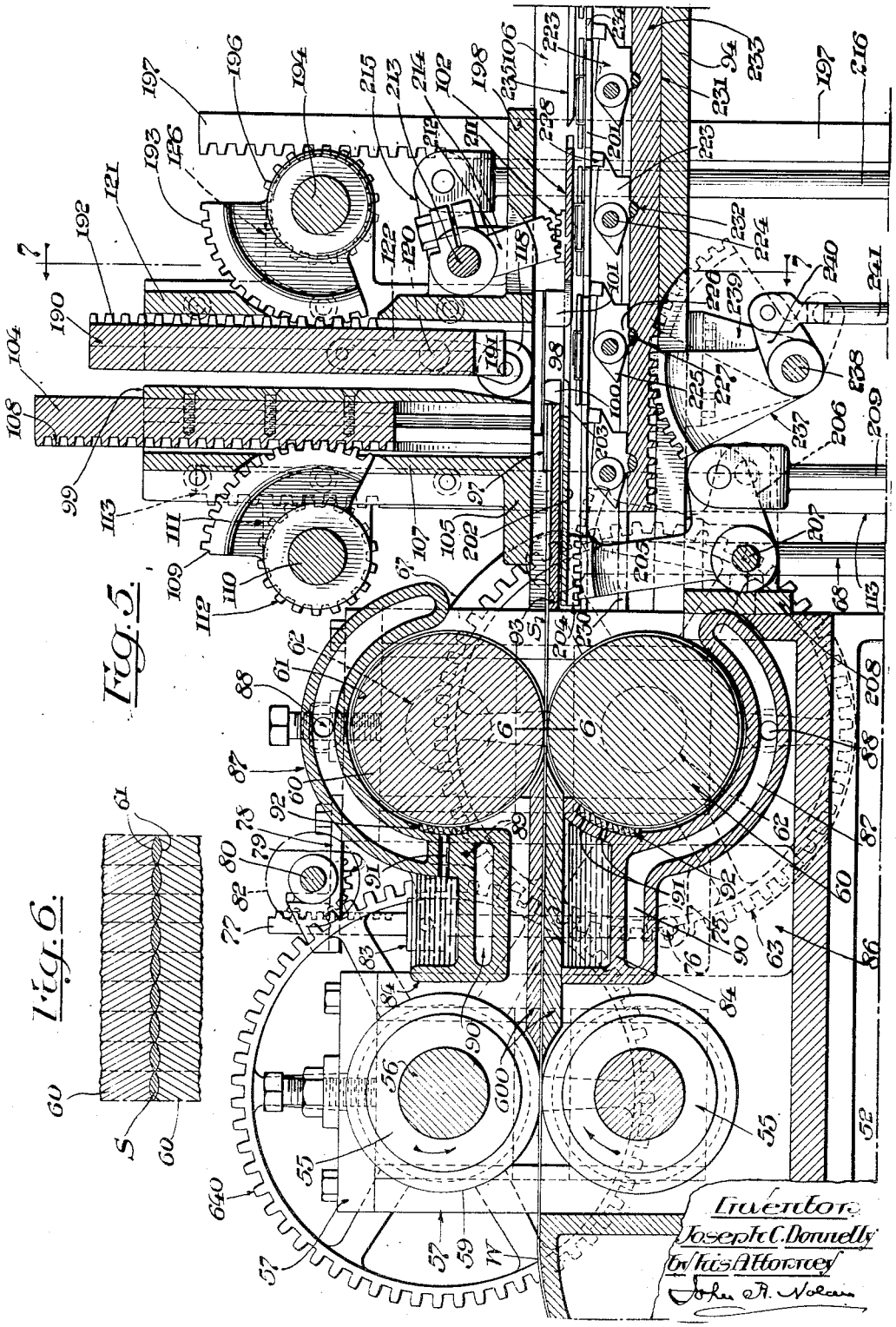

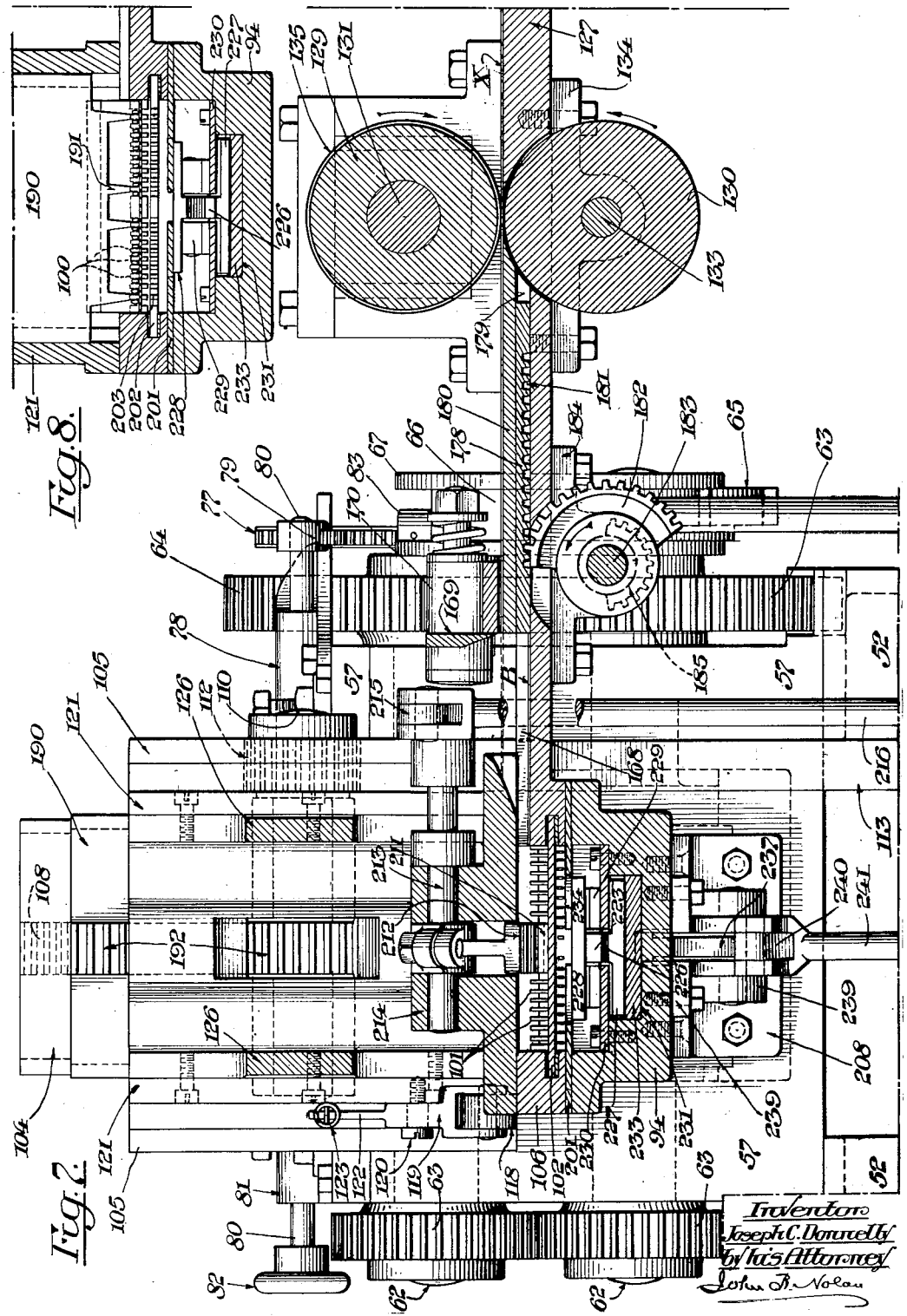

Oct. 27, 1936. J. C. DONNELLY 2,058,573
MACHINE FOR MAKING AND ASSEMBLING MATCHES AND IGNITION HOLDERS
Filed Nov. 22, 1934 17 Sheets-Sheet 7
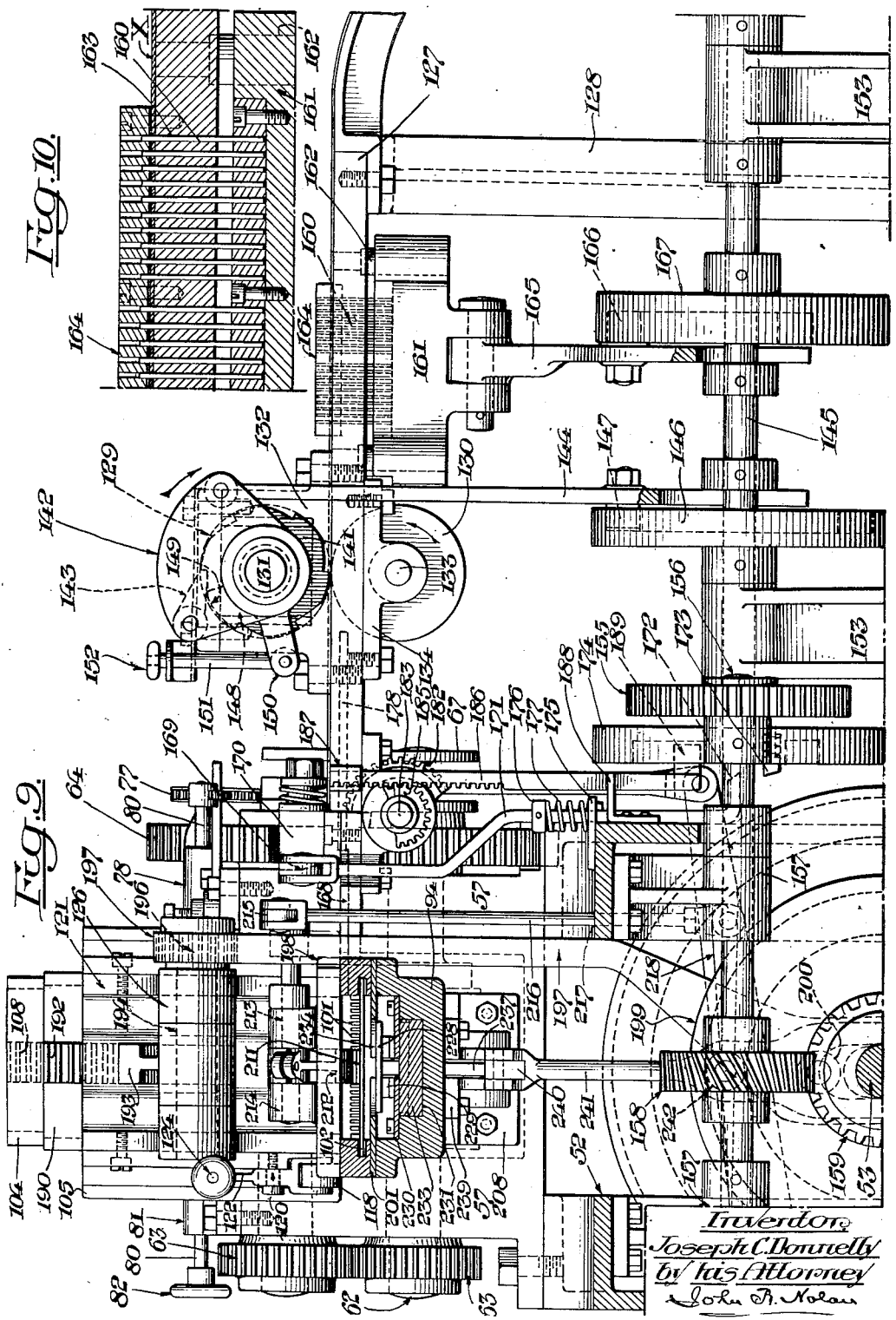

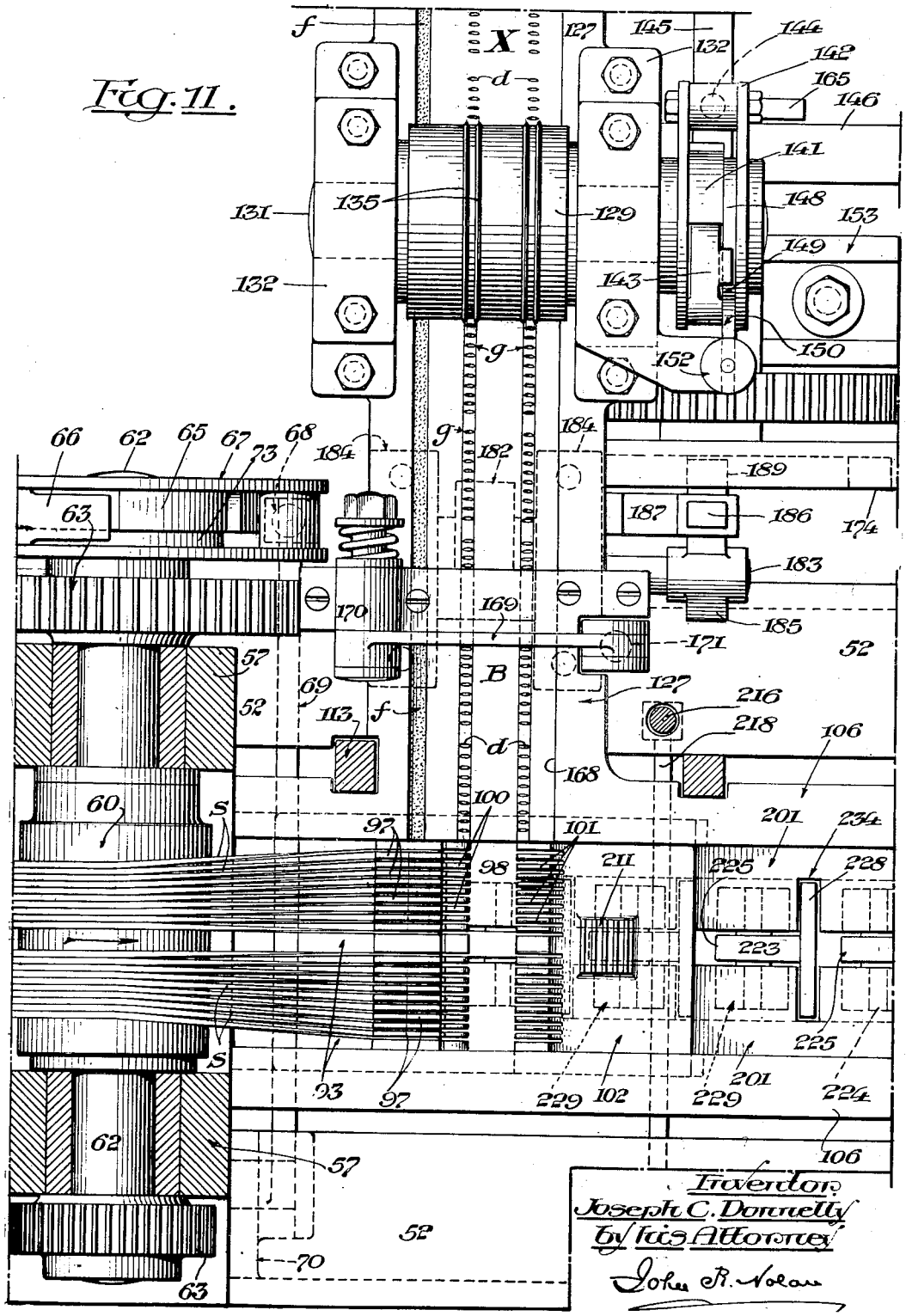

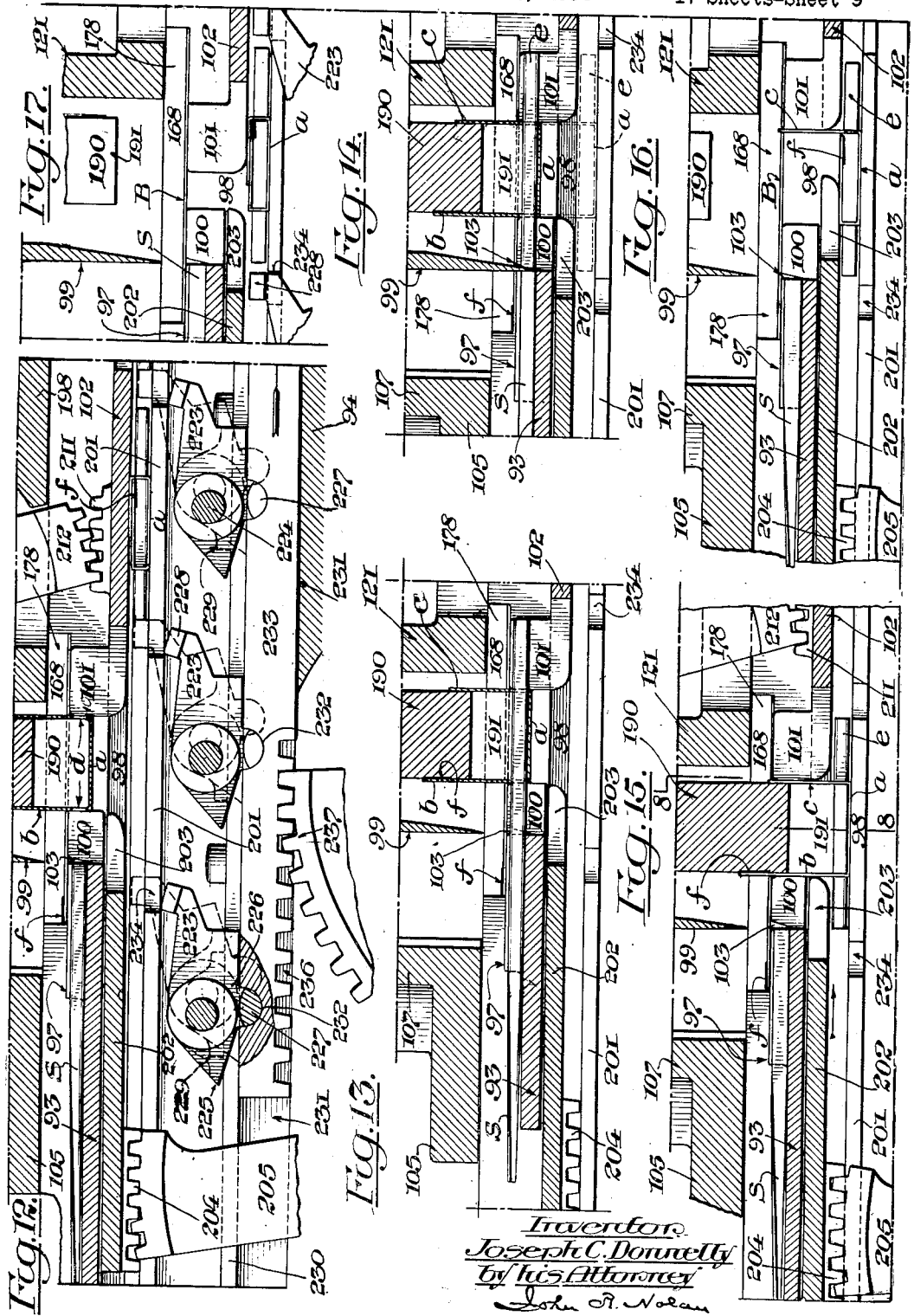

Oct. 27, 1936.   J. C. DONNELLY   2,058,573
MACHINE FOR MAKING AND ASSEMBLING MATCHES AND IGNITION HOLDERS
Filed Nov. 22, 1934   17 Sheets-Sheet 10

Inventor
Joseph C. Donnelly
by his Attorney
John R. Nolan

Oct. 27, 1936.  
J. C. DONNELLY  
2,058,573  
MACHINE FOR MAKING AND ASSEMBLING MATCHES AND IGNITION HOLDERS  
Filed Nov. 22, 1934  
17 Sheets-Sheet 11
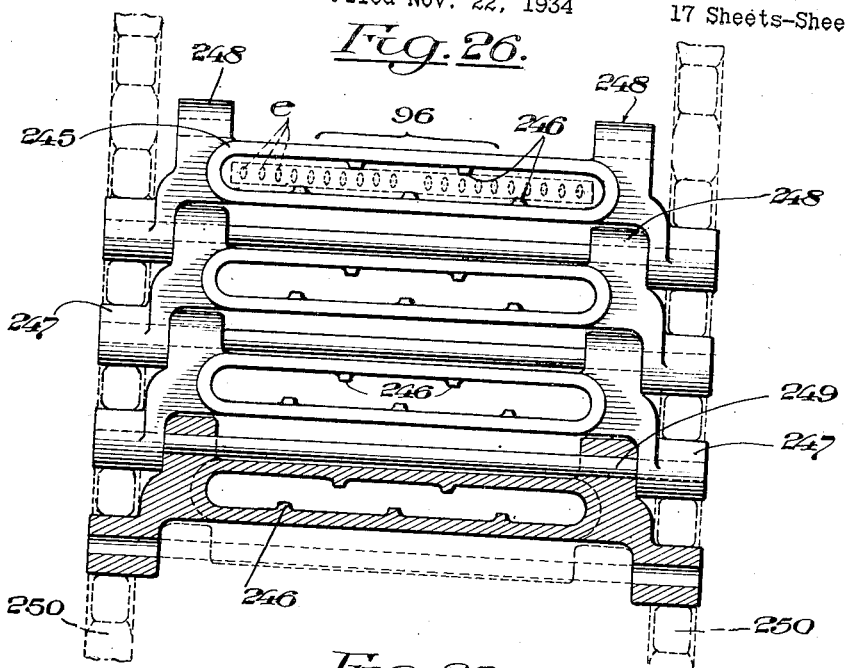
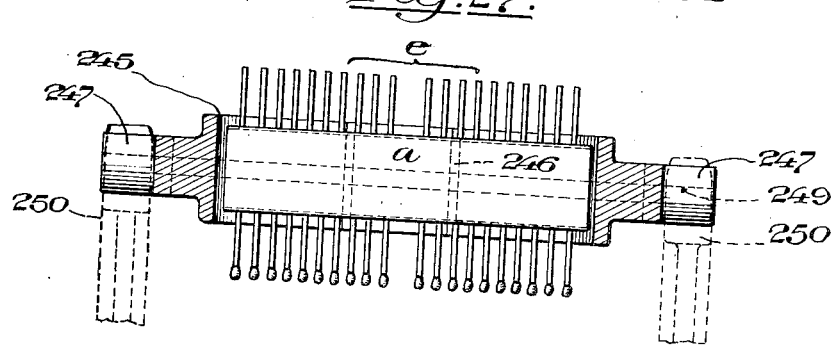
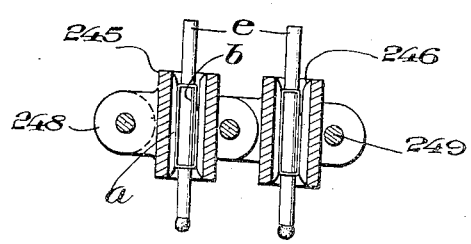
Inventor  
Joseph C. Donnelly  
by his Attorney  
John A. Nolan

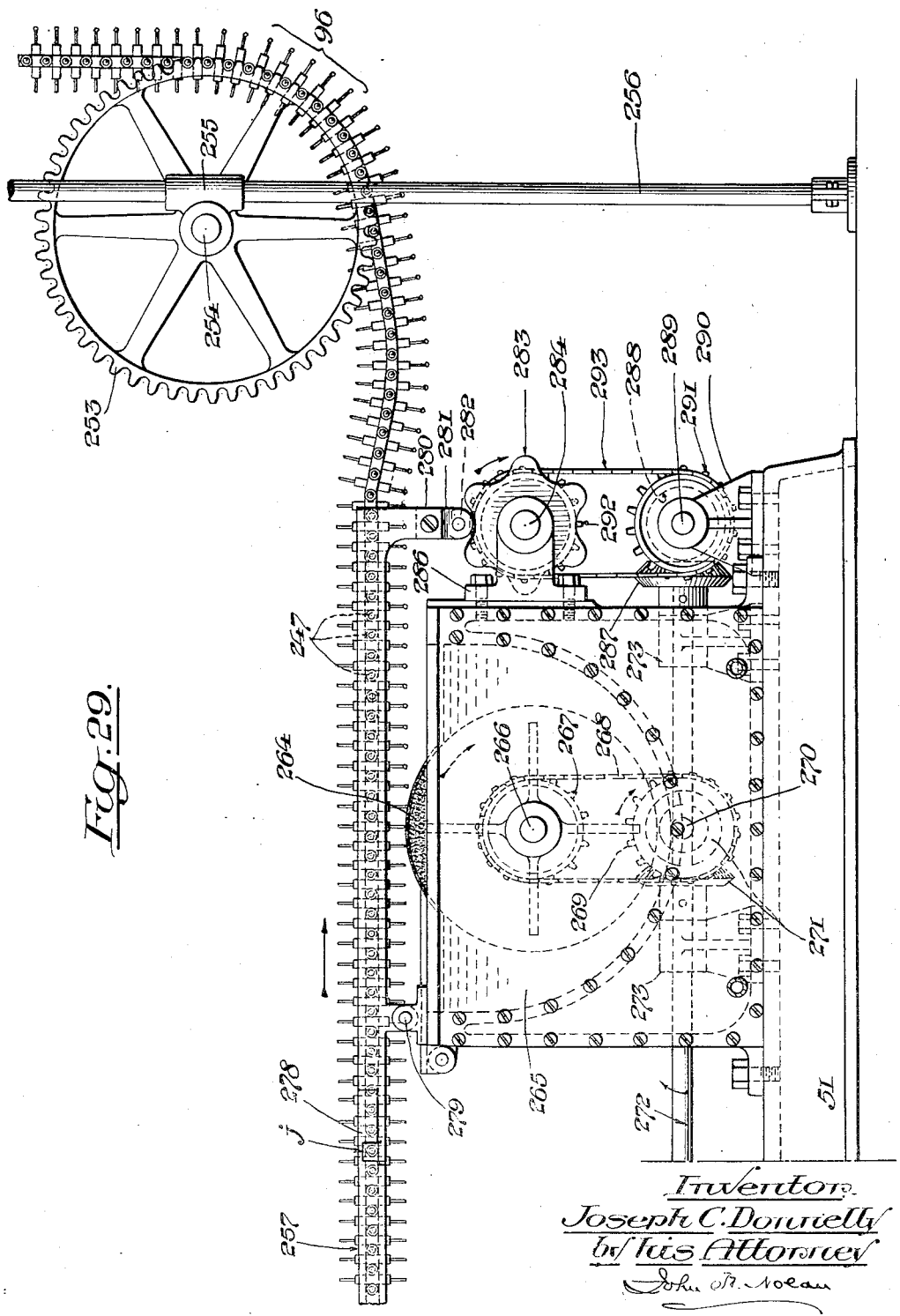

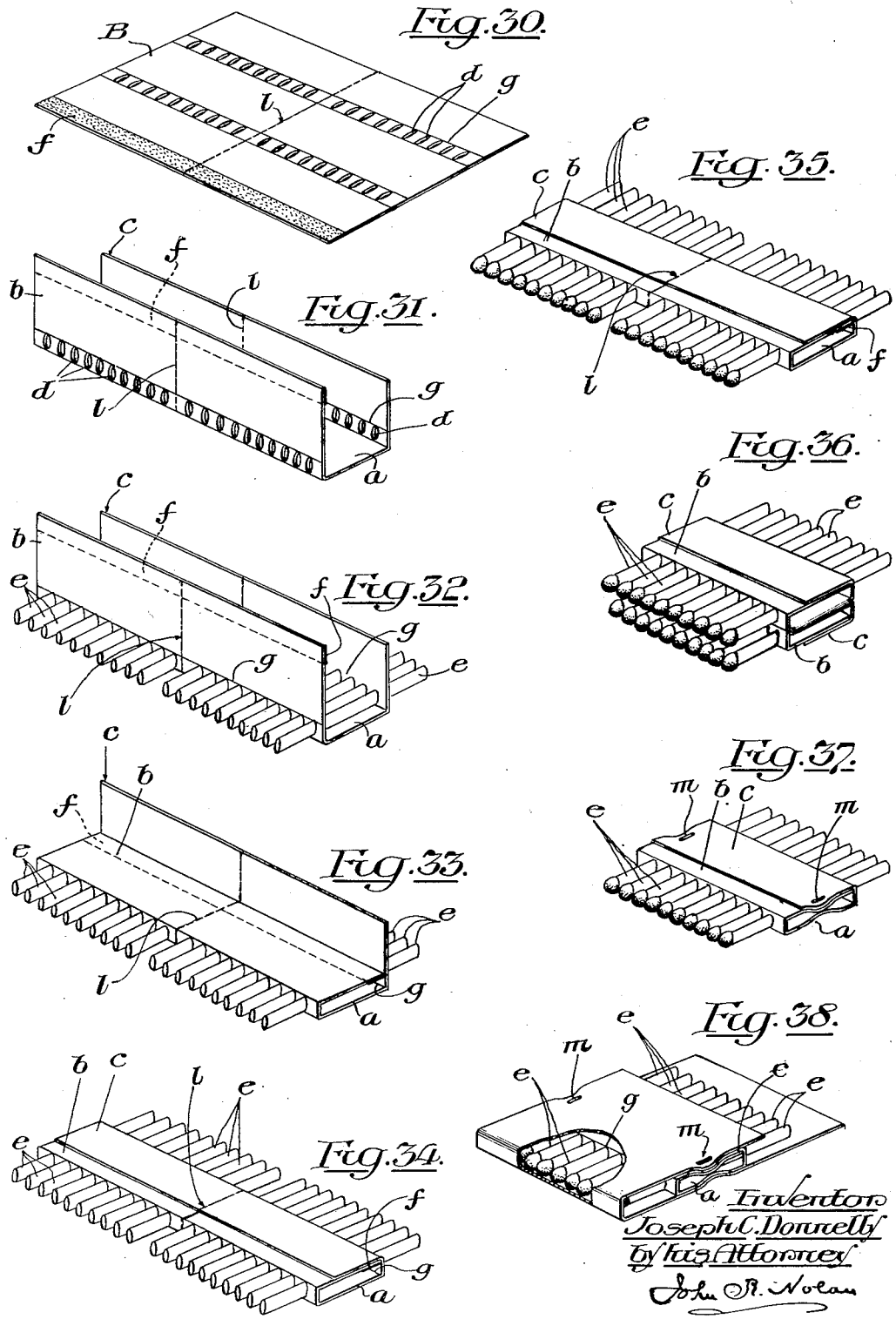

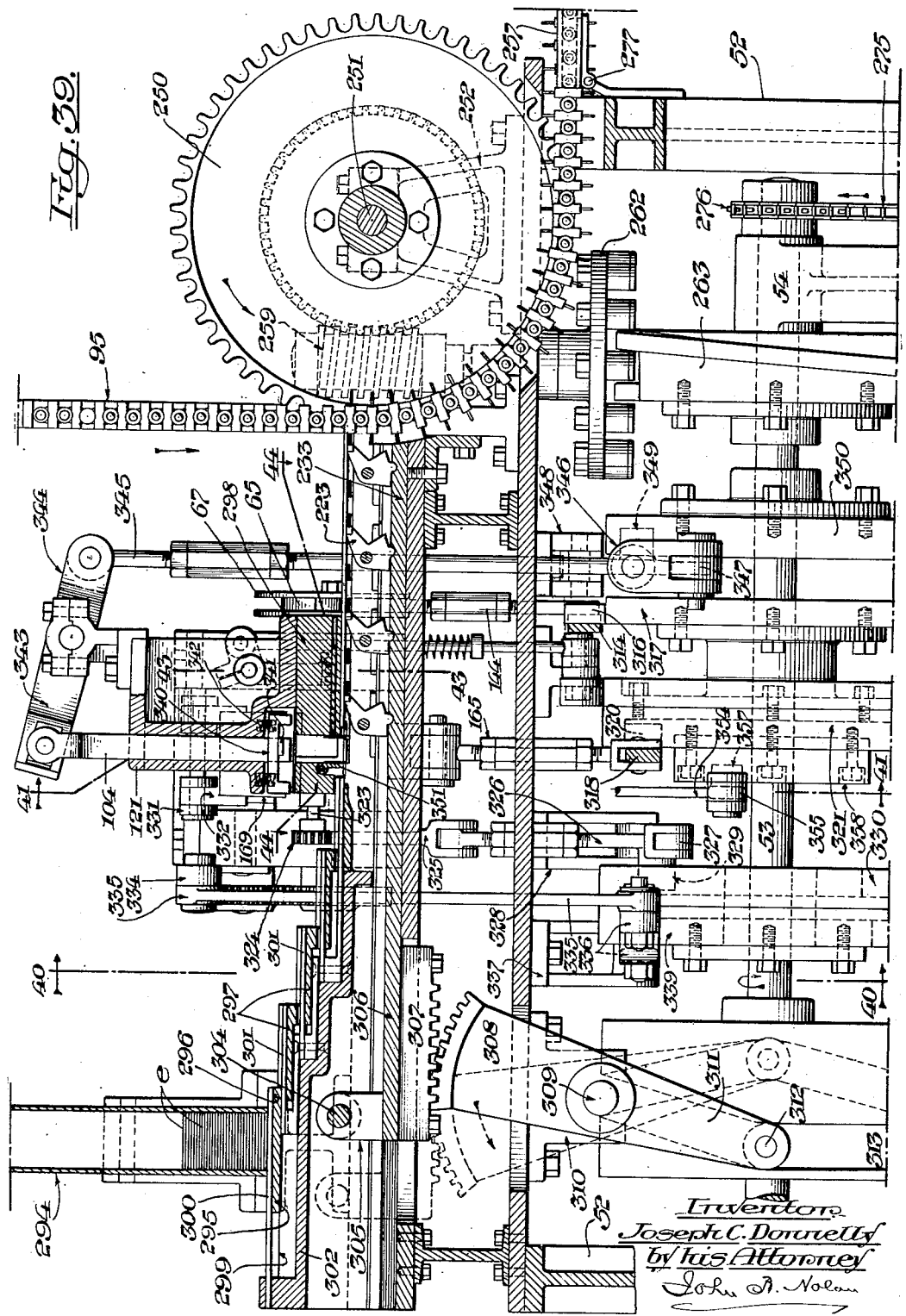

Oct. 27, 1936.  J. C. DONNELLY  2,058,573
MACHINE FOR MAKING AND ASSEMBLING MATCHES AND IGNITION HOLDERS
Filed Nov. 22, 1934   17 Sheets-Sheet 15

Inventor,
Joseph C. Donnelly
by his Attorney
John A. Nolan

Oct. 27, 1936.  J. C. DONNELLY  2,058,573
MACHINE FOR MAKING AND ASSEMBLING MATCHES AND IGNITION HOLDERS
Filed Nov. 22, 1934  17 Sheets-Sheet 16

Inventor:
Joseph C. Donnelly
by his Attorney
John R. Nolan

Oct. 27, 1936.    J. C. DONNELLY    2,058,573
MACHINE FOR MAKING AND ASSEMBLING MATCHES AND IGNITION HOLDERS
Filed Nov. 22, 1934    17 Sheets-Sheet 17

Inventor
Joseph C. Donnelly
by his Attorney
John R. Nolan

Patented Oct. 27, 1936

2,058,573

UNITED STATES PATENT OFFICE 2,058,573

MACHINE FOR MAKING AND ASSEMBLING MATCHES AND IGNITION HOLDERS

Joseph C. Donnelly, Barberton, Ohio, assignor, by mesne assignments, to The Diamond Match Company, a corporation of Delaware Application November 22, 1934, Serial No. 754,379

18 Claims. (Cl. 93—2)

This invention relates to machines for making and assembling matches and ignition holders; that is to say, packets wherein matches are detachably supported row-wise in holders having ignition material adapted to effect the lighting of any individual match of a row as it is being withdrawn from its holder.

The principal object of my invention is to provide an organized machine embodying co-operating mechanisms whereby match splints (either produced on the machine or preformed and supplied thereto) of paperboard, wood or other suitable stock, are efficiently arranged in spaced parallel relation and delivered in an orderly manner to holders of paperboard, or the like, having suitably disposed friction or ignition material, and whereby said holders are efficiently formed in timed relation to the progress and delivery thereto of the splints or splint material. The machine also includes mechanism whereby the filled holders are successively transferred to a match conveyer which is operative to transport them through a circuit and present the splints to any usual or approved instrumentalities whereby composition is applied to the splints and set or dried in order to produce finished matches, and from which conveyer said holders with their match assemblies are finally discharged.

The accompanying drawings illustrate exemplifying embodiments of my invention which will be hereinafter particularly described, and the scope of the invention then expressed in the appended claims.

In the drawings—

Fig. 4 is a plan of the mechanisms shown in Fig. 3.

Fig. 5 is a longitudinal vertical section, medially of the machine, as on the line 5—5 of Fig. 4.

Fig. 6 is a partial transverse vertical section through the adjacent co-acting portions of a pair of splint forming and compressing rolls, as on the line 6—6 of Fig. 5.

Fig. 7 is a transverse vertical section, in a plane through the holder forming mechanism, as on the line 7—7 of Fig. 5.

Fig. 8 is a partial transverse vertical section in a plane through the former for the match holder, as on the lines 8—8 of Figs. 3 and 15.

Fig. 9 is a similar section in a plane directly through the holder forming mechanism, as on the line 9—9 of Fig. 1.

Fig. 10 is a longitudinal vertical section, enlarged through a part of the holder-web supporting table and the associated punch mechanism for perforating the web.

Fig. 11 is a longitudinal horizontal section through a portion of the machine in a plane through the bite of the feeding and compression rolls and directly above the holder-forming mechanism, as on the line 11—11 of Fig. 3.

Fig. 12 is a longitudinal vertical section through the holder forming mechanism and adjuncts, including an underlying trough which receives the partially formed holder with its contained splints, and a series of reciprocating feed dogs for feeding successive filled holders to the conveyer. In this view the former plunger and folding elements, together with the feed dogs, are shown in their relative positions as and when a holder blank is shaped immediately preceding the entry of the leading ends of a row of parallel splint strips into the partially formed holder.

Figs. 13, 14, 15, 16 and 17 are similar sections through the holder forming mechanism and adjuncts, showing the parts in their succeeding relative positions during the respective operations of inserting the splint ends into and through the partially formed holder; severing such ends into splint lengths; folding one side of the holder upon the splints, and completing the opposite fold or lap.

Figs. 18 to 25, inclusive, represent different cams hereinafter referred to for effecting the sequential operations of various moving parts of the machine.

Fig. 26 illustrates several connected links of the match conveyer, one of the links being in section and the others in front elevation.

Fig. 27 is a longitudinal vertical section through one of the links, showing therein one of the holders and the headed splints or matches.

Fig. 28 is a transverse section through two adjacent links, showing the holders and matches therein.

Fig. 29 is a side elevation of a portion of the conveyer as supplied with holders and splints, showing composition applying mechanism arranged in the path of the depending ends of the splints and including a vibratory trough for supporting the overlying portion of the conveyer.

Fig. 30 shows a perforated holder blank.

Fig. 31 shows the blank with its perforated sides bent upward to receive the splints.

Fig. 32 shows the blank with a row of splints frictionally held in its up-standing sides.

Fig. 33 is a similar view with the forward side of the blank folded upon the splints.

Fig. 34 represents the complete holder and its splint assembly.

Fig. 35 is a similar view with the matches completed.

Fig. 36 is a similar view showing the folder as partially severed midway of its ends and the two sections folded flatwise one upon the other.

Fig. 37 is a similar view of a section of the match filled holder showing the ends of the holder as stapled.

Fig. 38 is a similar view of the match filled holder as contained in a folder or wrapper and stapled thereto.

Fig. 39 is a longitudinal vertical section of a modified machine wherein preformed match splints are assembled in the holders.

Figure 40:
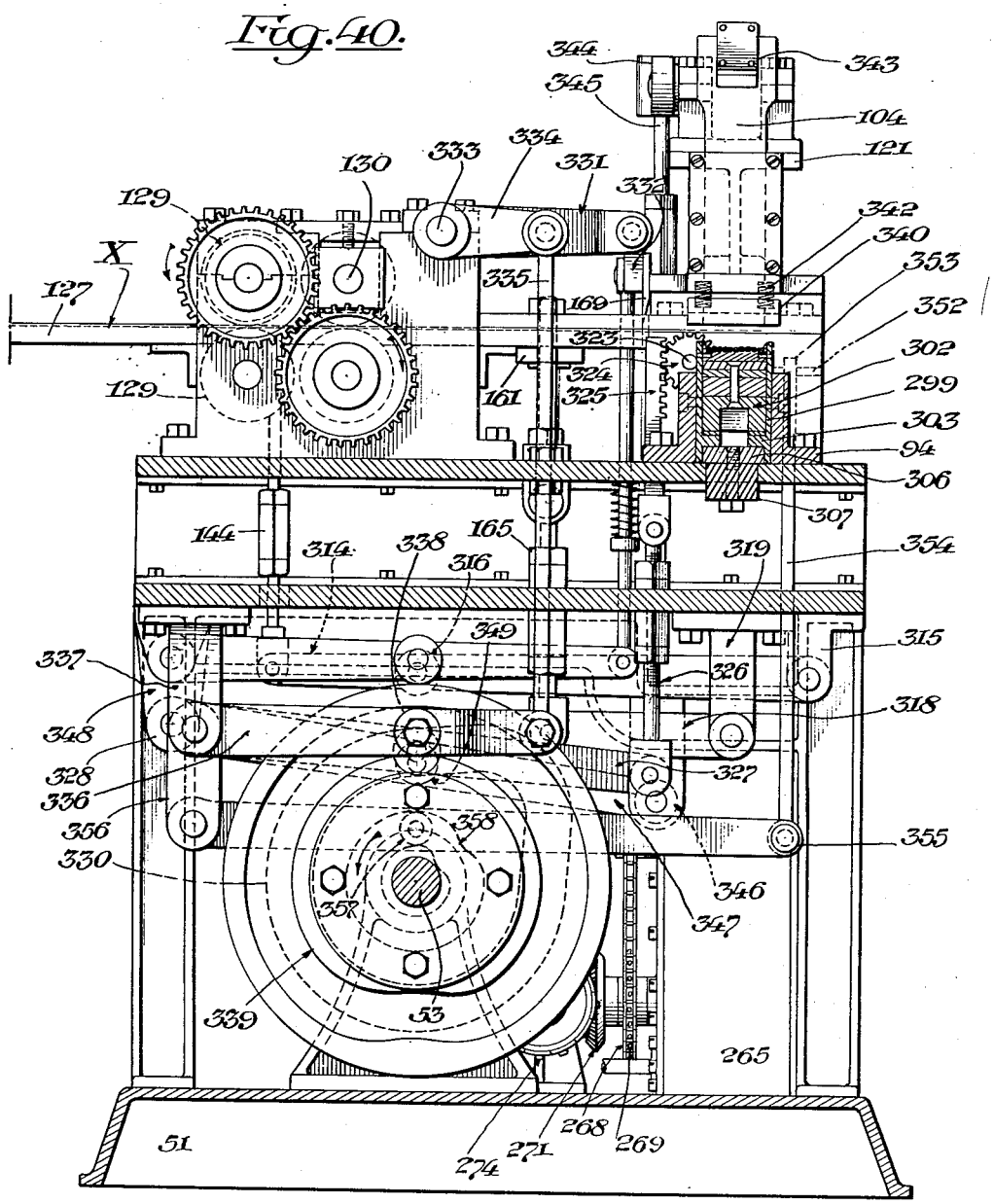

Fig. 40 is a transverse vertical section of the modified machine in a plane through the splint feeding mechanism, as on the line 40—40 of Fig. 39.

Figure 41:
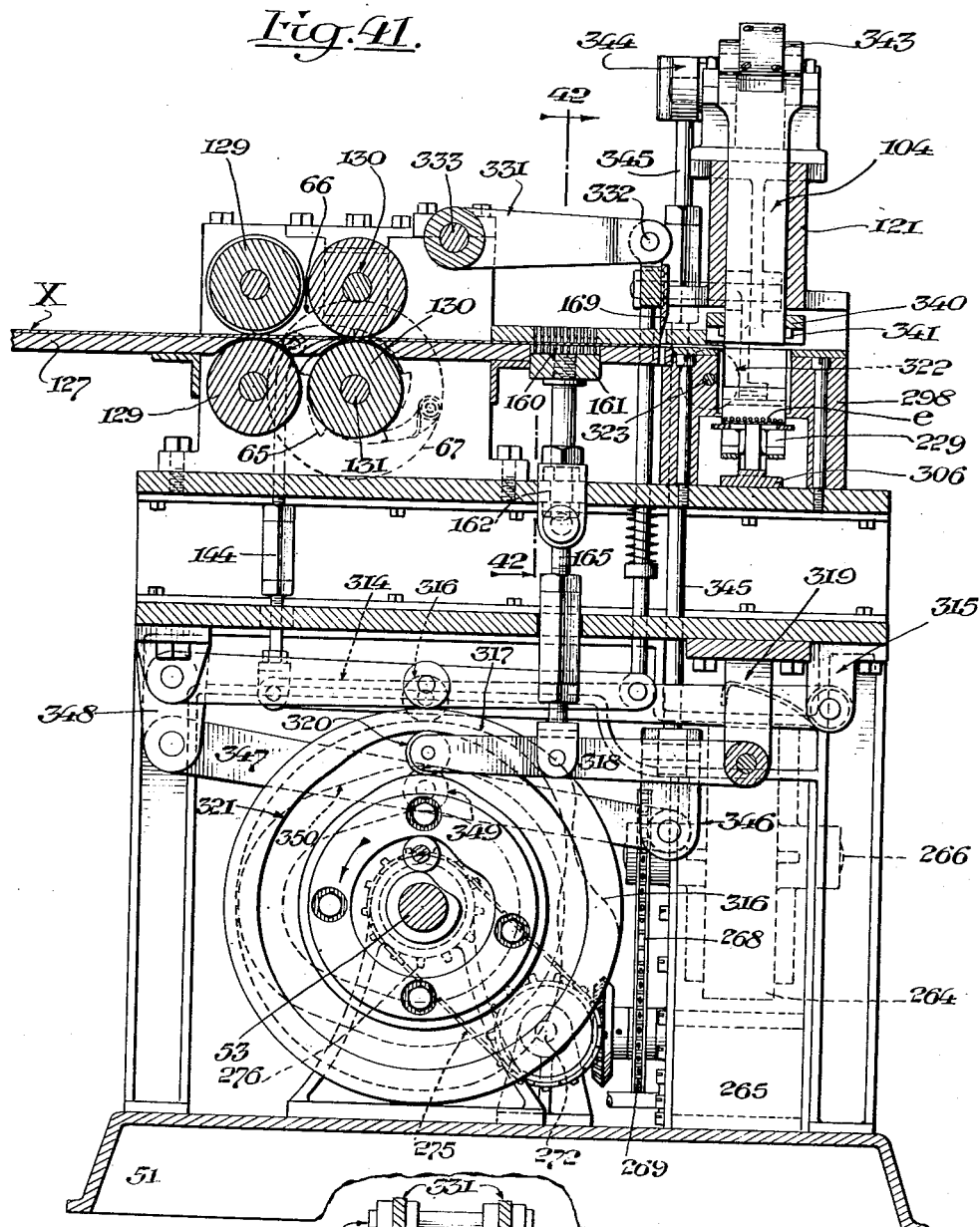

Fig. 41 is a similar section in a plane through the matrix intersecting the supporting table and the feeding, scoring, perforating and cutting mechanisms for the web from which successive blanks for the holders are severed, as on the line 41—41 of Fig. 39.

Figure 42:
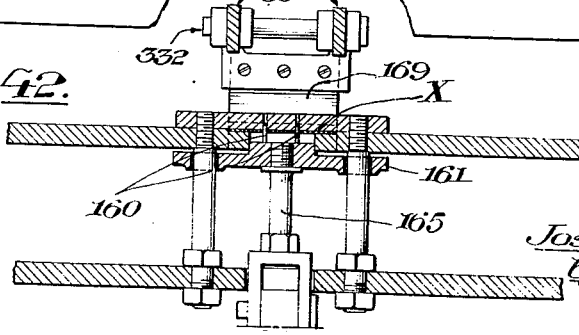

Fig. 42 is a transverse vertical section in a plane through the web perforating mechanism adjacent the cutter, as on the line 42—42 of Fig. 41.

Figure 43:
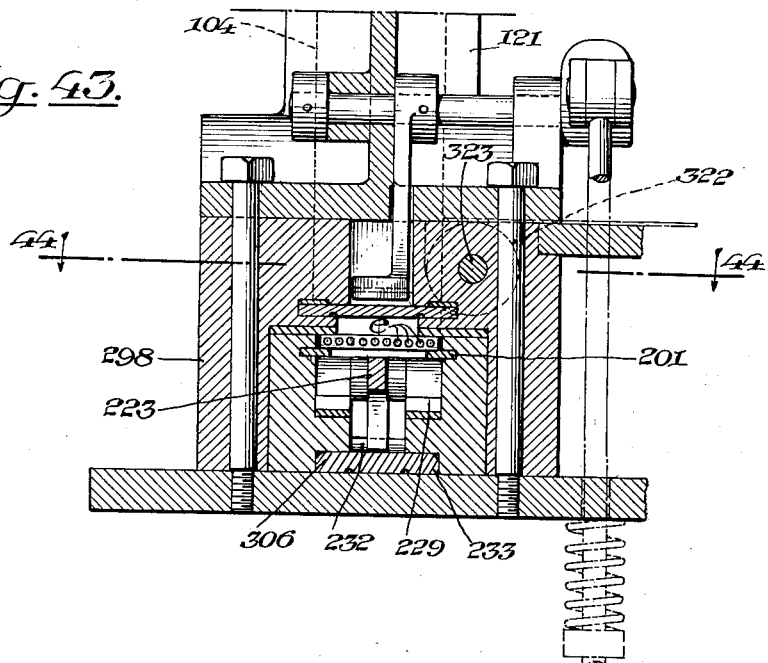

Fig. 43 is a transverse vertical section in a plane through the matrix block and its sliding folder, as on the line 43—43 of Fig. 39.

Figure 44:
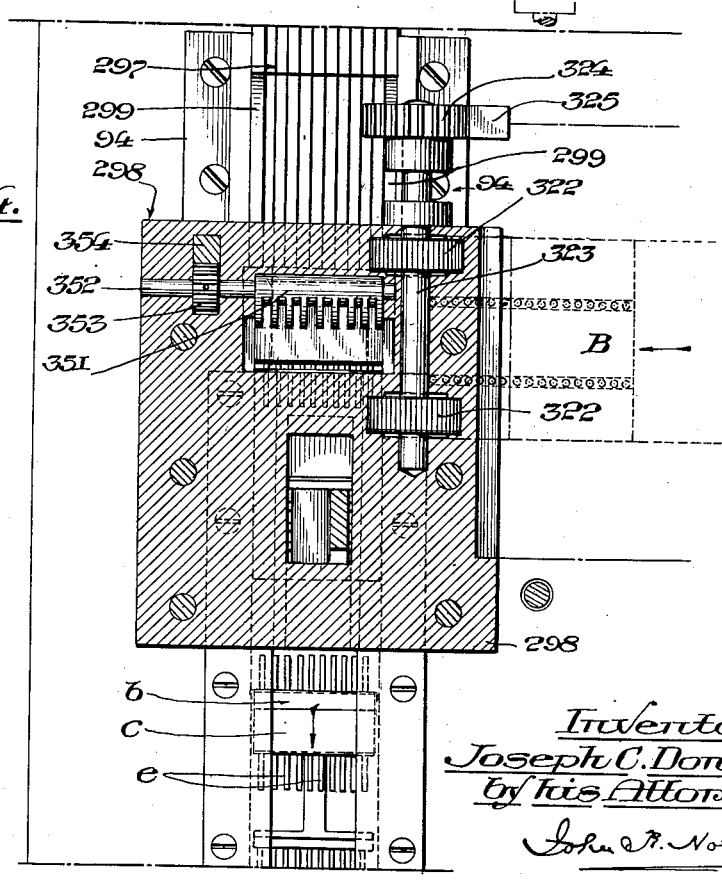

Fig. 44 is a horizontal section in a plane through the matrix block, as on the lines 44—44 of Figs. 39 and 43.

Referring to the drawings, 50 designates a supporting structure, including a bed 51 and side frames 52; and 53 designates a drive shaft extending longitudinally of and between the side frames and having its bearings in standards 54 on the bed.

55 designates a pair of intermittently rotatable slitting rolls, whereof the shafts 56 have their bearings in standards 57 on the respective side frames and have meshing gears 58 at their front ends. These rolls are provided with complementary spaced circumferential cutters 59 which in their rotation slit two parallel webs W of sheet match stock longitudinally into strips S, each strip being equal in width to that of a match splint. The webs, which are drawn from suitable rolls of stock (not shown) extend longitudinally of the frame structure and between the rolls 55, which rolls are actuated simultaneously step by step, each step being equal to the length of a match splint.

60 designates a second pair of rolls into the bite of which the slitted stock progresses from interposed guide plates 600 between the standards 57, which roll 60 are intermittently driven in synchronism with the first pair of rolls. The axes of the rolls 60 are in the same horizontal plane as the axes of the slitting rolls, and are formed with sets of complementary circumferential grooves 61 which correspond in number and relation with the splint spaces of the slitting rolls and are shaped and positioned to receive the progressing strips and to compress them into any desired form in cross-section.

As shown the opposing grooves of the rolls 60 are of concave formation so as to round the upper and lower surfaces of the respective strips of match stock. The rolls 60 thus constitute feeding, forming and compressing rolls for the strips.

In the present instance the shafts 62 of the rolls 60 are journaled in suitable bearings in the standards 57 and are provided with meshing gears 63 at the front of the machine. At the opposite side of the machine the shaft of the lower roll 60 and the shaft of the upper slitting roll 55 have fast thereon meshing gears 64 and 640 respectively. The lower shaft 62 is also equipped with a ratchet wheel 65 with the teeth of which engages a pawl 66 pivoted to and between a pair of spaced oscillatory sector plates 67 which are loosely mounted on such lower shaft. The plates are pivotally connected by means of a depending link 68 to one end of a lower horizontal rock-arm 69, the other end of which arm is in turn pivoted on a hanger 70 affixed to the rear side of the frame structure. The rock-arm is provided with a roll 71 which is operatively fitted in the race of a face cam 72 (separately shown in Fig. 21) fast on the drive shaft, the contour of which race is such that at a predetermined interval in the rotation of the cam the rock arm 69 is lowered and raised in a manner to reciprocate the link 68 and thereby oscillate the pawl plates 67, thus advancing the ratchet wheel one step and accordingly impelling the two sets of rolls 55 and 60 in synchronism for the purposes described.

Manually controlled means is preferably provided whereby the oscillating pawl 66 can be moved into or from engagement with the ratchet wheel 65, in order to render the rolls 55 and 60 active or inactive and thus effect the starting or stopping of the web feed as may be desired during the operation of the machine.

Figure 3:
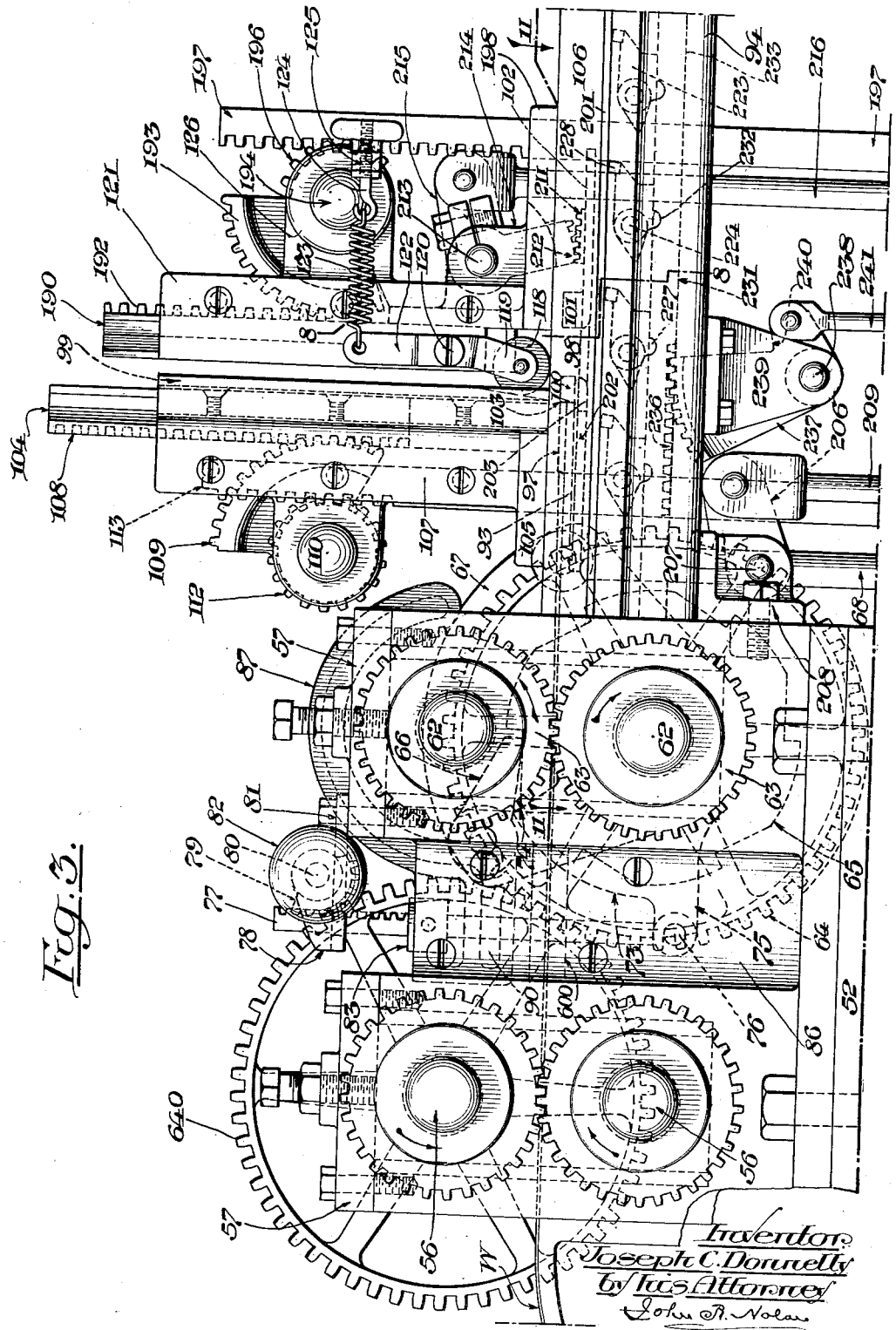
Fig. 3 is an elevation, enlarged, of the paper stock-feeding mechanism shown in Fig. 1, together with portions of succeeding mechanisms.
Figure 18:
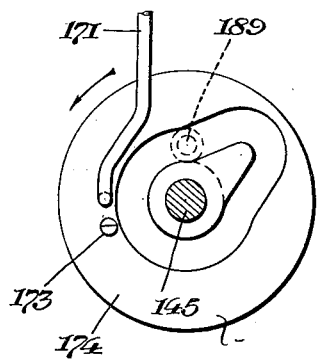
Figure 19:
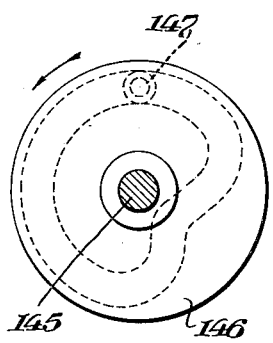
Figure 20:
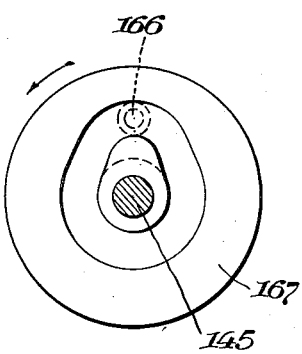
Figure 21:
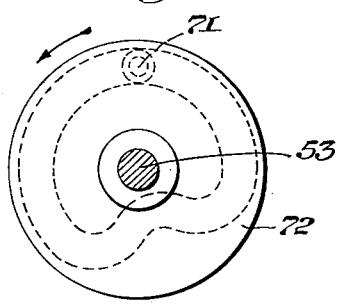
Figure 22:
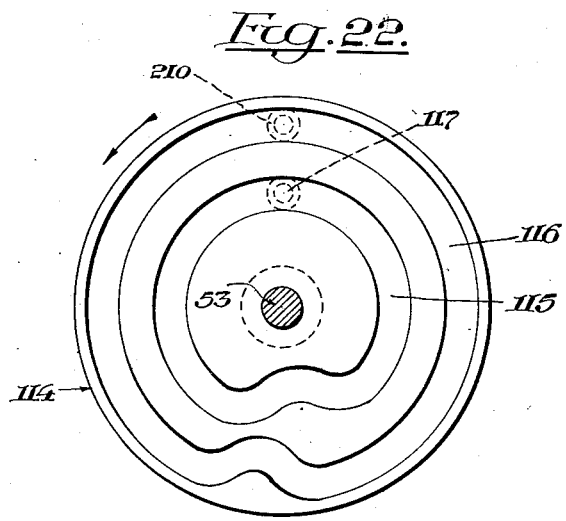
Figure 23:
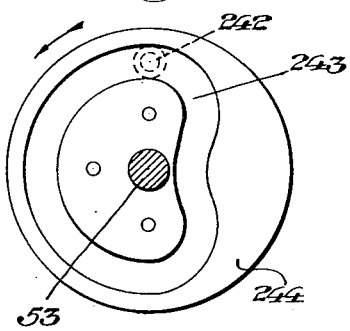
Figure 24:
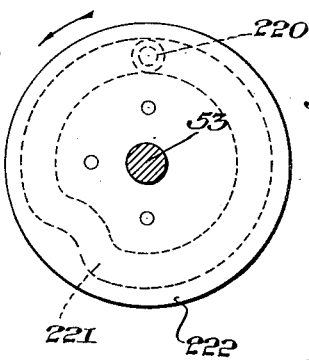

In the present instance such starting and stopping means comprises a rocker plate 73 which is loosely mounted on the shaft 62 of the lower roll 60 and is formed with an upwardly projecting acting portion 74 directly under the pawl 66. This plate is formed with a lug 75 which is pivotally connected, as at 76, Fig. 3, with the lower end of a vertically reciprocative rack rod 77. The upper end of this rod is guided in an opening in an extension of a bearing bracket 78 which is conveniently bolted on the bearing standard 57 at the back of the machine. In mesh with the teeth of the rack is a sector gear 79 on the adjacent end of a transverse shaft 80 having its bearings in the bracket 78 and also in a similar bracket 81 which is bolted on the standard 57 at the front of the machine. The forward end of the shaft 80 is provided with a knob or handle 82 whereby it can be conveniently rotated in order to turn the sector gear 79 in the proper direction to raise or lower the rack rod 77 and the rocker plate 73, thus moving the latter against or from the pawl 66 as desired. The bearings for the shaft 80 are of substantial length so as to afford sufficient friction for the shaft to maintain in raised position the rocker plate and its connections, together with the pawl 66.

The rack rod is provided with a suitably-disposed stop 83 adapted to abut against the underside of the extension of the bracket 78 and limit the upward movement of the rack rod.

In order to wax the surfaces of the respective progressing strips of match stock at the bite of the forming rolls 60, thus facilitating and ensuring the efficient shaping and compression of the strips by such rolls, I arrange adjacent and longitudinally of the forward sides of the respective rolls two tanks 84 for paraffin or other suitable wax, which tanks are shown as provided with end lugs 85 bolted or otherwise secured to the webs 86 of the respective bearing standards 57. The rearward walls of the tanks are extended to form substantially semi-circular steam jackets 87 which overhang and underlie the adjacent peripheral surfaces of the upper and lower rolls 60 respectively.

The jacket of the upper tank is provided with a suitably-disposed inlet 88 for steam. This jacket communicates through ports 89 in the rear wall of the tank with a jacket 90 formed in the bottom of the tank, and therefore the wax contents of the tank is maintained in a molten state and the periphery of the adjacent roll is efficiently heated.

The rear wall of the upper tank has a series of openings 91 leading to a strip 92 of soft absorbent material, such as leather, which is secured to such wall and arranged in contactual relation to the grooved periphery of the upper roll 60. Thus the molten wax in the upper tank is supplied to the strip 92 and thereby applied to the opposing heated surface of the upper roll, which roll, in turn, carries the wax deposited thereon to the opposing upper surfaces of the progressing strips S at the bite of the rolls.

The extension jacket 87 of the lower tank is shown as a continuation of the jacket 90 of that tank, which former jacket is also provided with a steam inlet 88. The rearward wall of the lower tank is formed with perforations 91 through which wax is supplied to a fixed strip 92 of absorbent material arranged adjacent the lower roll 60. The lower tank and its jackets are thus heated similarly to the upper tank and jackets, and likewise wax is applied to the lower roll and thereby carried to the opposing lower surfaces of the progressing strips S at the bite of the rolls. Hence as and when the strips leave the two rolls 60 such strips are individually waxed and compressed and the stock thereof is thereby efficiently stiffened for subsequent conversion to match splints.

As illustrated the two rows of stiffened strips progress to and along a supporting plate 93 fast on a trough structure 94 which extends longitudinally of and rearward of the side frames 52. This structure is supported at one end by the bearing standards 57 for the shafts of the rolls 55 and 60, and at the opposite end by vertical guide members 95 for a match conveyer 96 presently described. The plate 93 is formed or otherwise provided at the rear of its upper surface with spaced parallel ribs 97 forming narrow open top guideways corresponding in number with the splint strips, each guideway being equal in width to the thickness of a strip, the thickness being the minor axis thereof.

The free ends of the strips are partially turned and entered vertically in the respective guideways and as the strips are fed with their major axes at right angles to the upstanding ribs 97, and due to the fact that the minor axes of the strips are equal in width to the space between the ribs, the strips are turned in the space between ribs 97 and the rolls 60. Hence as the strips leave the rolls 60 their major axes are substantially in the same plane and as the strips enter the guideways between the ribs 97, the minor axes of the strips are in substantially the same plane, thus imparting a slight twist from flatwise to vertical position to the strips as they pass from the rolls to the guideways, the intervening twisted portions of the strips being slightly diverged laterally by virtue of the spaced relation of the latter at the guideways. (See Figs. 5 and 11.)

In each succeeding step of the vertically-disposed leading ends of the match strips beyond the guideways, such ends are advanced into and across a horizontally-disposed rectangular throat member, constituting a matrix 98, which extends transversely of the path of the strips, and which matrix at this juncture contains a partially formed splint holder of paperboard or the like, as will presently appear. This partially-formed holder in the form illustrated comprises a basal portion $a$ having spaced up-standing perforated side walls $b$ and $c$ through the respective alining perforations $d$ of which the splint strips are simultaneously inserted and are immediately thereafter severed into match splint lengths $e$ by a reciprocating cutter 99 hereinafter described. The row of splints thus produced is supported by the partially formed holder with the ends of the splints projecting beyond the respective upstanding perforated sides of the holder, it being noted that the contour of the perforations of the sides is such that the splints are frictionally held thereby.

The front wall of the matrix is constituted by a series of spaced vertically-disposed partition members 100 which form, in effect, continuations of the respective ribs 97 on the plate 93, and the rear wall of the matrix is constituted by a similar series of partition members 101 formed on a slide plate 102 which is reciprocable toward and from the interior of the matrix. The spaces between the adjacent partitions at the front and back respectively of the matrix permit the projecting ends of the splints which are supported by the perforated sides of the partially formed holder within the matrix to pass freely downward when the filled holder farther is depressed in the matrix. The slide plate 102 with its partitions constitutes a folding member for the sides of the holder, as will presently appear.

The cutter 99 previously referred to for severing the splint lengths from the splint strips S when the strips are inserted in the partially formed holder, comprises a knife blade which is vertically reciprocative through the path of the strips in a plane between the guide ribs 97 and the adjacent partition members 100 of the matrix, such members being suitably beveled or recessed, as at 103, for the passage of the cutting edge of the blade.

In the present instance this blade is fastened to a plunger 104 which is vertically guided in the standards 105 of a housing rising from longitudinally extending bars 106 on the respective sides of the trough structure 94. The housing includes a vertical wall 107 connecting the standards. The plunger 104 has in its front face a row of rack teeth 108 in mesh with a sector gear 109 which extends through a suitable opening in the housing wall. This sector gear is fast on a transverse rock-shaft 110 having its bearings in brackets 111 formed on the respective standards 105.

The rear end of the shaft 110 has fast thereon a pinion 112 in mesh with the teeth of a vertically reciprocative rack-bar 113 which is guided in a recess in the adjacent supporting bar 106. The rack-bar 113 depends adjacent a face cam 114 fast on the drive shaft. This cam, which is separately shown in Fig. 22, has two cam races 115 and 116, whereof the inner race 115 receives a lateral roll 117 on the rack-bar; the contour of the cam race 115 being such that when the splint strips have been positioned in the partially formed holder, as previously explained, the rack-bar is reciprocated to lower and raise the plunger 104 and its cutter in relation to the path of the splint strips. The outer race 116 of the cam 114 is designed to actuate flap folding devices hereinafter described.

In order to support the cutting edge of the reciprocating knife blade against rearward displacement during its splint severing strokes, thus maintaining such edge in accurate cutting position, I provide a pair of pressure rolls 118 which bear yieldingly against the rearward beveled surface of the blade adjacent the respective ends thereof. These rolls are rotatably mounted in the depending arms 119 of vertical levers which are fulcrumed, as at 120, on parallel standards 121 of a housing supported on the bars 106 immediately in rear of and parallel with the housing for the plunger 104. In the present instance the upper arms 122 of the levers are connected by means of retracting springs 123 with adjustable screw hooks 124 mounted in the lugs 125 of bearing brackets 126 on the respective standards 121. (See Figs. 3, 4, 5 and 9.)

As illustrated the folder slide plate 102 is mounted in guideways formed in the longitudinally disposed bars 106 on the trough structure, the back bar being formed on or secured to one end of a table 127 which extends rearwardly at a right angle to the path of the splint strips and in longitudinal alinement with the matrix. The outer end of the table 127 is suitably-supported on a post or posts 128.

The table 127 supports a web X of paperboard or other suitable material which is drawn from a roll (not shown). This web is of suitable width for its intended purpose and is provided along its upper surface with a marginal stripe f of ignition material. The web is intermittently fed along the table toward the matrix by means of a pair of suitably-disposed feed rolls 129 and 130, the shaft 131 of the upper roll 129 having its bearings in boxes 132 arranged above the table 127, and the shaft 133 of the lower roll 130 having its bearings in brackets 134 on the bottom of the table. The upper roll 129 is preferably provided with spaced peripheral scoring rings 135 which are effective to score the web longitudinally with two suitably-disposed pairs of parallel fold lines g. (See Figs. 9 and 11.)

In each step of the web X toward the feed rolls 129 and 130 two parallel longitudinal rows of perforations d are formed in the web in line with the spaces between the respective pairs of score lines, so that when such lines are formed the rows of perforations are flanked thereby.

Each feeding step of the rolls 129 is equal to the length of a splint holder. As illustrated the upper roll is intermittently rotated by mechanism substantially similar to that hereinbefore described for actuating the upper forming and compression roll 60; that is to say, a ratchet wheel 141 fast on the shaft 131 of the upper roll; a sector frame 142 loose on said shaft; a pivoted pawl 143 on the sector frame for engaging the ratchet teeth; a plunger 144 pivotally connected at its upper end to the sector frame and having a bifurcated lower end which straddles an auxiliary driven shaft 145 located below the table and at a right angle to the drive shaft; a face cam 146 (shown separately in Fig. 19) fast on said shaft 145, and a roller 147 extending from the plunger into the cam race. The contour of the race is such that at a predetermined interval in the rotation of the cam the plunger 144 is vertically reciprocated in a manner to oscillate the pawl frame 142, thus advancing the ratchet wheel 141 one step and accordingly impelling the roll 129 in timed relation with the slitting and compression rolls 55 and 60, previously described.

Manually controlled means is preferably provided for rendering the pawl 143 active or inactive, as desired, which means is substantially similar to that hereinbefore described in connection with the pawl and ratchet mechanism for actuating the slitting and compression rolls; that is to say, a rocker plate 148 loose on the shaft 131 of the feed roll 129 is provided with a projecting acting portion 149 directly under the pawl 143, and also with a lug 150 which is pivotally connected with the lower end of a vertically movable stem 151 having a handle or knob 152 at its upper end. (See Figs. 9 and 11.)

Figure 1:
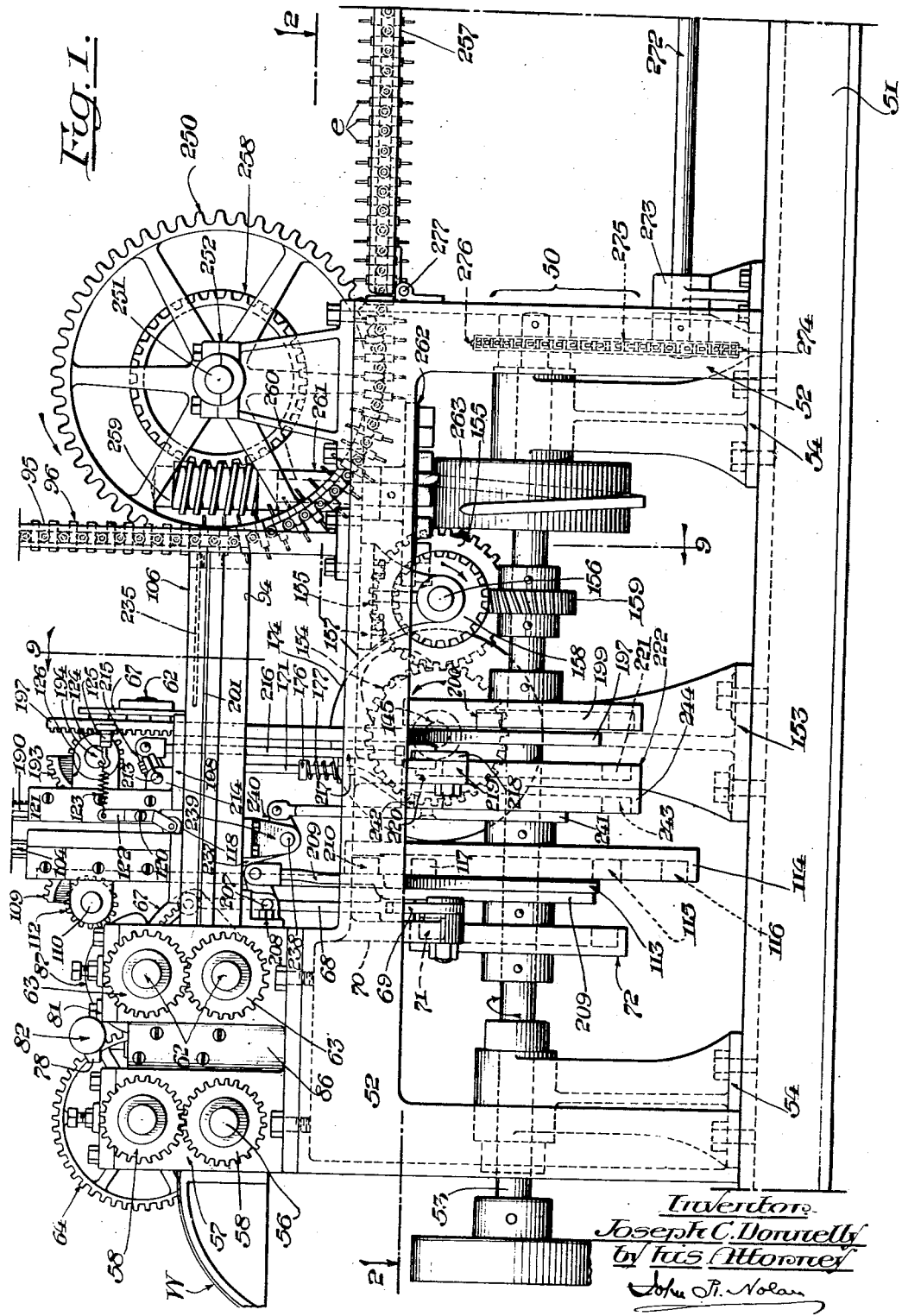
Figure 1 is a side elevation of a machine embodying my invention for making and assembling paper splints, showing the receiving end of the endless match conveyer into which the holders with their associated splints are successively inserted and thereby carried through the dipping and drying paths.
Figure 2:
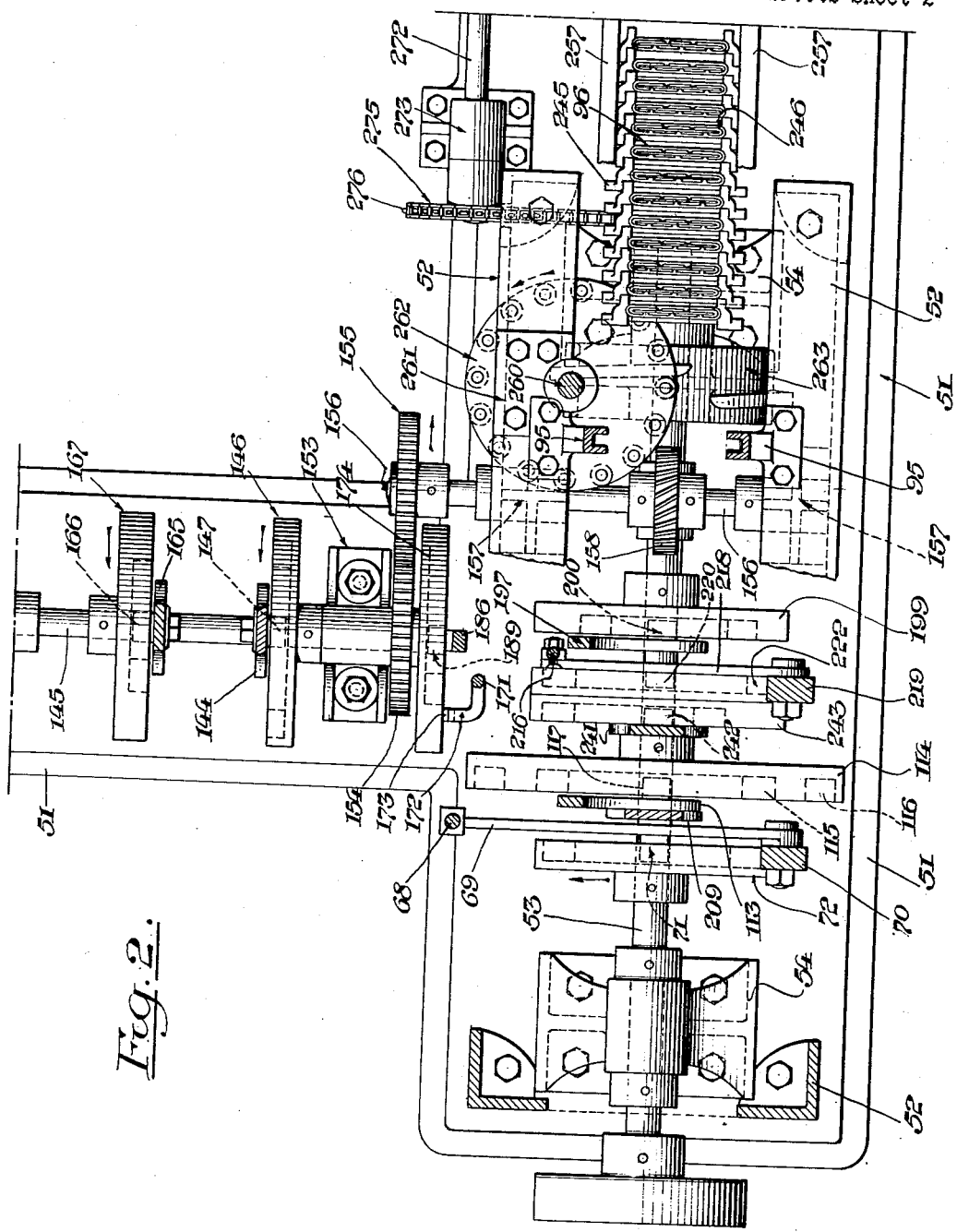
Fig. 2 is a longitudinal horizontal section of the machine in a plane above the various actuating cams on the main drive and driven shafts, as on the line 2—2 of Fig. 1.

The auxiliary shaft 145, which has its bearings in standards 153 on the frame bed 51, is driven in any suitable manner from the main shaft. In the present instance the shaft 145 is provided at its inner end with a gear 154 in mesh with a similar gear 155 fast on a parallel shaft 156 having its bearings in hangers 157 bolted to the main side frames 52; the shaft 156 being provided with a gear 158 which meshes with and is driven by a similar gear 159 on the drive shaft 53. (See Figs. 1, 2 and 9.)

In the present instance the parallel rows of perforations d are formed in the web by the action of two up-standing rows of punches 160 on a vertically reciprocative cross-head 161 which is guided at its corners by studs 162 depending from the table 127. The table is vertically perforated, as at 163, for the free passage of the punches, and it is also provided immediately above the path of the web with a suitably perforated shearing plate 164 with which register the free ends of the ascending punches when they penetrate the web.

The cross-head 161 is pivotally connected to the upper end of a bar 165, which is bifurcated at its lower end and slidably straddles the drive shaft. The bar 165 is provided with a lateral roller 166 operatively fitted in the race of a face cam 167 fast on the driven shaft 145, the contour of which race is such that the cross-head and its punches are raised and lowered during each succeeding dwell of the holder web. The cam 167 is separately shown in Fig. 20.

The leading portion of the web X is severed therefrom at a point rearward of the matrix to form a holder blank B which is positioned flatwise in a rectangular recess 168 in the top of the table 127 at the rear end of the matrix, the floor of such recess being in the same horizontal plane as the top of the matrix, as seen in Figs. 7, 9 and 11. The blank is separately shown in Fig. 30. The dimensions of the recess are approximately the same as those of the blank in order that the latter when it is severed from the web shall drop flatwise into the recess.

In the present instance the means for severing each succeeding holder blank B from the web X comprises a cutter bar 169 which overhangs the path of the web. This bar is pivoted at one end on a bearing bracket 170 which is fastened on the respective sides of the web-supporting table. The opposite end of the cutter bar is pivoted to the upper end of a depending actuating rod 171 having a toe 172 in the path of a suitably located spring-pressed tappet stud 173 on a face cam 174 which is fast on the driven shaft 145. This cam is separately shown in Fig. 18. The lower portion of the rod 171 is guided in a perforated plate 175 on the adjacent side frame 52, and is provided with a collar 176 spaced above the plate. A spring 177 interposed between the collar and the plate maintains the rod and the cutter normally raised. (See Figs. 2 and 9.)

The location of the stud 173 on the cam 174 is such that when the leading portion of the holder web is projected over the recess 168 the stud impinges against the top of the opposing toe 172 of the rod, thereby depressing the rod and cutter against the action of the spring 177 and effecting the severance of the web. When the stud escapes the toe, the rod and cutter are caused to resume their normal position.

In the present instance each holder blank when it is flatwise seated in the recess 168 of the table, is pushed forward to a position directly over the matrix by means of a horizontally-reciprocative feed plate 178 which is slidably mounted in a suitable guideway 179, including a cover plate 180 overlying an extension of the blank receiving recess of the web table 127.

The feed plate 178 has on its lower surface a central gear rack 181 in mesh with a sector gear 182 fast on a transverse shaft 183 having its bearings in brackets 184 beneath the table.

Fast on one end of the shaft 183 is a smaller sector gear 185 in mesh with a vertically reciprocative rack-bar 186 which is guided in brackets 187 and 188 on the table 127 and the adjacent frame structure 52, respectively. The lower end of the rack-bar is provided with a lateral roller 189 in registry with the race of the cam 174 previously referred to. The contour of the cam race is such that when the tappet stud 173 actuates the cutter rod 171 and the holder blank is seated in the recess 168 of the table, the rack-bar 186 is raised and lowered in a manner to effect the reciprocation of the feed plate 178 toward and from the matrix. In the forward stroke of the plate the opposing blank (B) is bodily pushed forward and positioned over the matrix, the portion a of the blank between the two rows of perforations spanning the matrix throat while the lateral portions, which when bent upward constitute the side walls b and c, rest upon the spaced partition members 100 and 101, at the respective sides of the matrix. When the blank is thus positioned the portion of the blank having the marginal ignition surface f overlies the guide ribs 97 for the free ends of the splint strips.

Immediately upon the positioning of the holder blank B over the matrix, the longitudinal midportion a of the blank is uniformly depressed throughout its length a suitable distance into the matrix and hence the longitudinal side portions of the blank are upwardly bent by the adjacent sides of the matrix in a manner to position the respective rows of perforations d of such side portions in the horizontal path of the leading ends of the splint strips S, as seen in Fig. 12.

Figure 25:
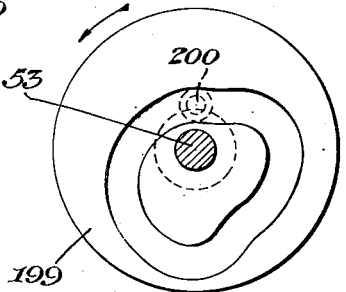

The preferred means for depressing the blank into the matrix comprises a plunger 190 vertically-reciprocative into and from the matrix and having spaced depending projections 191 adapted to pass freely through the spaces between the paths of the adjacent strip ends entering the partially folded blank. This plunger 190 is guided in the housing standards 121 previously referred to. The plunger has a row of rack teeth 192 in mesh with a sector gear 193 fast on a transverse rock-shaft 194 having its bearings in the brackets 126 on the respective housing standards 121, which sector gear extends through a suitable opening in the wall between the standards. The rearward end of the shaft 194 has fast thereon a pinion 196 in mesh with the teeth of a vertically reciprocative rack-bar 197 which is guided in a recess in the adjacent end of the housing base 198. The lower end of this rack-bar is bifurcated and slidably straddles the drive shaft 53 adjacent a face cam 199 fast on the shaft, and is provided with a roller 200 operatively fitted in the race of the cam. The contour of the cam race is such, as seen in Fig. 25, that in one half rotation of the cam the rack-bar 197 is raised at succeeding intervals, and then in the other half rotation the rack-bar is lowered, thus through the described gearing successively lowering the plunger and then raising it. That is to say, when the cam 199 is effecting the movement of the feed plate 178 to advance the holder blank toward and over the matrix, and for a short interval thereafter, the cam 199 is lifting the rack-bar 197, thus lowering the plunger 190 upon the body of the blank and depressing the latter in the upper portion of the matrix, as seen in Fig. 12. Consequently the longitudinal sides of the blank are bent upward and the respective rows of perforations therein are positioned to receive the splint strips as previously mentioned.

Then, following a sufficient dwell of the plunger to permit the entry and passage of the strips in and through the perforations of the partially formed holder blank and the severance of the splints from the strips, as seen in Figs. 13 and 14, the plunger is farther depressed so as to push the partially formed holder with the assembled splints therein down through the matrix and upon a pair of longitudinally-extending spaced plates 201, (as seen in Fig. 15), which are supported upon the side walls of the trough 94. In the final descent of the blank through the matrix the projecting ends of the row of splints therein pass freely through the vertical slots or spaces in the walls 100 and 101 of the matrix, while the upstanding sides of the blank are supported by such walls. This done, the cam 199 depresses the rack bar 197, and the latter through the described connections returns the plunger 190 to its raised or normal position above the matrix in readiness to act upon the next succeeding holder blank which is positioned over the matrix.

When the plunger 190 ascends the upstanding sides of the blank are successively folded inwardly and downwardly, in overlapping relation, upon the assembled splints, as will now be described, thus forming a flat tubular holder in which the splints are frictionally held.

As illustrated the forward side b of the blank is folded by a horizontally reciprocative folder plate 202 which is slidably mounted in longitudinal guideways in the supporting bars 106 on the trough structure so as to be movable in a plane directly above that of the row of splints when the partially formed blank is seated on the supporting plates 201 and beneath the matrix. The forward or acting end of the folder plate 202 normally underlies the adjacent slotted wall 100 of the matrix and is similarly slotted to form a comb-like member 203 through the spaces of which the adjacent ends of the splints freely pass when the holder, with its splints, is pressed below the matrix by the plunger 190, as previously described.

In the present instance the underside of the folder plate 202 is formed with a gear rack 204 in mesh with a gear segment 205 on the end of the longer arm of a bell-crank which is fulcrumed on a shaft 207 supported in an angle bracket 208 secured to the bottom of the trough structure and the adjacent bearing standard 57. The other arm 206 of the bell-crank is pivotally connected to the upper end of a depending rod 209 which is bifurcated at its lower end and slidably straddles the drive shaft 53 adjacent the face cam 114 previously referred to. The outer race 116 of this cam receives a roll 210 on the rod 209 and the contour of the race is such that at a proper interval of time in the rotation of the cam 114 the rod 209 is quickly reciprocated, thereby oscillating the bell-crank and moving the folder plate 202 against and from the opposing upstanding side b of the holder blank. In its active stroke the slotted end of the folder plate presses the side b inwardly and downwardly upon the row of match splints in the holder, as seen most clearly in Fig. 16, whereupon the companion folder plate 102 previously referred to is reciprocated against and from the opposing up-standing side c of the holder blank, such latter plate thus bending the side c inwardly and down upon the first folded side b and completing the flat tubular formation of the holder containing the splints, as seen in Fig. 17.

The acting end of the folder plate 102 is slotted similarly to that of the folder plate 202 to permit the free downward passage of the adjacent splint ends when the holder and its splints are depressed by the plunger 190.

On the upper surface of the rear folder plate 102 is a gear rack 211 in mesh with a gear arm 212 fast on a rock shaft 213 which is mounted in and between rearwardly extending lugs 214 on the adjacent plunger housing. On the rearward end of the shaft 213 is a crank 215 pivotally connected with the upper end of a depending rod 216 which is guided in an opening 217 in the adjacent side frame 52. The lower end of the rod is pivotally connected to one end of a rockarm 218 which, in turn, is pivotally connected to a bracket 219 on the front side frame 52. This arm carries a roll 220 in register with the race 221 of a face cam 222 (separately shown in Fig. 24) fast on the main shaft 53. The contour of the cam race 221 is such in relation to the race 116 of the cam 114, that in the concurrent rotation of the two cams the arm 218 is oscillated to effect the reciprocation of the folder plate 102 immediately after the operation of the forward folder-plate 202, the rearward plate 102 moving inwardly in respect to the matrix throat during the retraction of the forward folder-plate 202. (See Figs. 1, 5, 7, 11 and 12.)

When the two folder plates are in retracted position, upon the completion of each succeeding flat tubular holder, as seen in Fig. 5, each holder, with its splints, is moved from under the matrix and intermittently fed along the plates toward the rear of the trough 94 and into the match conveyer 96.

In the present instance the means for this purpose comprises a succession of equally spaced pivoted dogs 223 which are mounted within and are reciprocative longitudinally of the trough in the space below the packet supporting plates 201. (See Figs. 5 and 12 to 17, inclusive, and Fig. 23.)

Each of the dogs comprises a flat body transversely bored at its forward end to receive a pivot shaft 224, a forwardly extending toe 225 on said body; a depending neck 226 on the body slightly in rear of a vertical plane intersecting the axis of the bore; a rounded cross-bar 227 on the neck, and a polygonal cross-bar 228 at the upper rearward end of the body.

The pivot shaft 224 is carried by a pair of spaced supporting blocks 229 which laterally embrace the body of the dog and slidably rest upon spaced longitudinally extending plates 230 secured to the bottom of the trough and overhanging a longitudinal guideway 231 in the trough bottom.

The bottom cross-bar of the dog is rockably seated in a transversely extending recess 232 in the upper surface of a reciprocative bar 233 which is slidably mounted in the guideway 231 and maintained therein by the plates 230. Hence by reciprocating the slide bar within proper limits the dog is swung upward or permitted to resume its normal position; that is to say, when the slide, together with the dog and the supporting blocks for the pivot shaft, are in the extreme forward position, as seen in Figs. 5 and 12, the body of the dog is down with its lower edge resting upon the slide 233 and its upper cross-bar 228 located directly beneath alining transverse slots 234 formed in the respective plates 201 and opening into the longitudinal space between the inner edges of such plates, and when the slide 233 is initially moved rearward the dog by virtue of the described mounting of the lower cross-bar 227 on the slide in respect to the axis of the dog is swung upward in an arc about such axis, as indicated by dotted lines in Fig. 12. In this movement of the dog its upper edge enters the longitudinal space between the supporting plates 201, and the upper cross-bar 228 passes through the overlying cross slots so as to clear the upper surface of the plates 201, whereupon the toe 225 of the dog abuts against the opposing surface of the slide and limits the upward movement of the dog. As the rearward movement of the slide 233 continues, the dog, together with the supporting blocks 229, are carried therewith, the cross-bar immediately passes upon the supporting plates 201 and moves therealong until the slide reaches the end of its stroke. At this juncture the cross-bar 228 overlies a succeeding pair of transverse slots 234 in the plates 201, and the dog thus being unsupported at its rearward end, gravitates to its normal or down position within the trough and with the cross-bar 228 positioned below the plates 201, as seen in Fig. 12.

The series of spaced feed dogs are simultaneously actuated, similarly spaced slots 234 for the passage of the cross-bars 228 of the respective dogs being provided in the supporting plates 201; it being noted that when the slide is in its forward position, as illustrated in Figs. 5 and 12, the first dog 223 and the adjacent slot 234 therefor in the supporting plates 201 are located immediately forward of the matrix. Hence when a splint filled holder is supported on the plates 201 beneath the matrix as previously described, and the slide 233 is moved rearward, said dog is swung upward and its cross-bar 228 thereby lifted through the adjacent slots and positioned to bear against the opposing ends of the row of splints and advance such splints and their holder to a zone where in the next succeeding rearward stroke of the slide such splints and holder are engaged by the adjacent dog and advanced thereby along the trough, and so on such splints and holder are advanced step-by-step by the successive dogs until the splints and holder reach the rearward end of the trough and in the final step are inserted in the match conveyer. As the splint-filled holders are produced at the forward end of the trough they are successively fed in spaced relation to the rear of the trough.

A pair of spaced strips 235, which are supported by the side bars 106 on the trough structure and directly overlie the path of the holders in their travel along the trough, serve to maintain the folds of the holder in their closed overlapping relation during the travel of the holder along the trough to the match conveyer.

Any suitable means for reciprocating the feed-dog actuating slide bar 233 may be employed. In the present instance this bar has formed in its under surface a longitudinally extending gear rack 236 which meshes with a sector gear 237 constituting one arm of a bell crank that is fast on a transverse shaft 238 having its bearings in hangers 239 supported by the trough. The other arm 240 of the bell crank is pivotally connected to the upper end of a depending rod 241 having a bifurcated lower portion which slidably straddles the drive shaft. The rod has a lateral roll 242 in operative engagement with the race 243 of a face cam 244 fast on the drive shaft 53; the contour of the cam race being such as to effect through the associated connections the requisite reciprocation of the dog actuating slide. (See Figs. 1, 5, 12 and 23.)

The match conveyer 96 herein illustrated comprises an intermittently movable endless chain of longitudinally slotted parallel bars 245 which in the operation of the machine are positioned in succession at the rear of the trough 94 to present the slot of each bar to a filled holder as it is forcibly moved by the rearmost feed dog 223. As each holder is pushed into the slot of the adjacent bar, the holder is frictionally held between the opposite walls of the slot, and hence as the conveyer progresses the inserted holder is advanced therewith. (See Figs. 1, 2, 26, 27, 28 and 29.) Preferably the walls of the slot are provided with inwardly projecting ribs 246, whereof those of one wall alternate with those of the other wall so as to clamp the sides of the holder at spaced points between its ends and thereby ensure the uniform support of the holder in and parallelly of the bar.

Each of the slotted conveyer bars 245 is provided at its ends with pairs of laterally-disposed oppositely extending eye members 247 and 248, respectively, which are so relatively disposed that when a series of the bars are assembled in succeeding parallel relation with the proximate eye members of adjacent bars in overlapping relation and connected by pivot rods 249 extending through the associated eye members, the series of bars are efficiently articulated. (See Fig. 26.)

The eye members 247 project beyond the respective sides of the chain of bars, thus affording trunnions adapted to engage pairs of spaced sprocket wheels for guiding the conveyer through the match dipping and drying paths. Two pairs of sprocket wheels are shown, namely, one 250 fast on a shaft 251 having its bearings in standards 252 at the rear of the main supporting frame, and the other pair 253 loose on a shaft 254 supported in brackets 255 on posts 256 located some distance rearward of the main frame.

The trunnions 247 in the portion of the conveyer approaching the holder-inserting station, adjacent to which the sprocket wheels 250 are mounted, are guided in the vertical guide bars 95, previously referred to, while the trunnions in the portion of the conveyer progressing from the sprocket wheels 250 are guided in spaced horizontal rails 257 which extend rearwardly from the side frames 52 so that the filled holders borne by the horizontal run of the conveyer are transported with their splints in vertical position and depending below the path of the conveyer.

Suitable means for intermittently driving the sprocket wheels 250 in timed relation with the dog actuating slide 233 is provided, in order that each succeeding slotted bar 245 of the conveyer shall be properly positioned to receive the leading splint filled holder from the slide.

In the present instance, the shaft 251 of the sprocket wheels 250 has fast thereon a worm wheel 258 in mesh with a worm 259 on a vertical shaft 260 having its bearings in a bracket 261 on the back side frame 52. Fast on the lower end of the shaft 260 is a pin wheel 262 with the depending pins of which a cam wheel 263 fast on the drive shaft 53 co-acts to impart intermittent rotation to the pin wheel and its shaft, thus through the worm gearing correspondingly actuating the sprocket wheels 250 for the purpose mentioned.

As the filled holders are carried by the conveyer in its horizontal path between the rails 257, the depending ends of the splints carried by the holders are supplied with match composition. In the particular construction herein illustrated the splints progress in close relation to the periphery of a composition applying roll 264 mounted to rotate within a tank 265 in which the composition is contained. The shaft 266 of the roll has its bearings in the sides of the tank, and one end of the shaft is provided with a sprocket wheel 267 which is connected by means of a chain 268 with a similar wheel 269 on a lower shaft 270. The shaft 270 is connected by bevel gearing 271 with a longitudinally extending shaft 272 having its bearings in standards 273 on a continuation of the base 51 of the main frame. The end of the shaft 272 adjacent the rear standard 54 for the main shaft 53 is provided with a sprocket wheel 274 which is connected by a chain 275 with a similar wheel 276 on the adjacent end of the main shaft. Hence, motion is transmitted through the described gearing from the main shaft to the composition applying roll.

The rails 257 are hinged to the side frames, as at 277, and terminate in parallel sections 278 which are loosely jointed thereon, as at j, and are pivoted on brackets 279 at the sides of the tank. These sections overhang the tank and are provided at their free ends with depending legs 280 which are connected by a cross-piece 281 having a roller 282 which rests upon a star cam 283 on a transverse shaft 284 having its bearings in brackets 286 at the rear of the tank.

Fast on one end of the shaft 272 is a bevel gear 287 in mesh with a similar gear 288 on a transverse shaft 289 having its bearings 290 on the frame bed. The shaft 289 has fast thereon a sprocket wheel 291 which is connected with a similar wheel 292 on the shaft 284 by means of a chain 293. Thus the shaft 284 and the star cam thereon are continuously rotated to effect the intermittent raising and lowering of the pivoted rail sections and the portion of the conveyer travelling thereon. Therefore, as the filled holders progress over the composition roll, the lower ends of the splints are moved into and from the composition on the periphery of the roll, and thereby effectually "headed". Thence the holders are transposed by the conveyer through an extended drying path for the head composition, whereupon the holders with the now completed matches therein are successively ejected from the conveyer in any usual or approved manner.

In Fig. 35 of the drawings, is represented one of the match filled holders as produced by the hereinbefore described machine, which holder contains two separated rows of parallel matches disposed in the same plane with the ends of the matches projecting beyond the respective perforated portions of the holder, and with the ignition material *f* located on the inner marginal surface of the reinforced top fold of the holder in the region of the perforated portion through which the handle ends of the match splints extend. Hence when the holder is held in the usual manner and a match is being withdrawn therefrom the head of the match is temporarily retarded by the opposing perforated portion of the holder and then in the further progress of the match through the holder its head is ignited by frictional contact with the opposing ignition material as the head approaches and escapes through the opposite perforated portion of the holder.

If desired the double row holder may be transversely severed midway of its ends, as on the dotted line 1 of Fig. 35, so as to provide two separate match packets; or the double row holder may be partially cut on such line and one section thereof folded upon the other to provide a compact packet containing two rows of matches, as illustrated in Fig. 36.

The overlapping folds of the holder may be fastened together and to the back of the holder by means of staples *m* or other fasteners, as seen in Fig. 37, or such folds may be glued together. Also if desired the filled holder may be inserted in a folder or wrapper of paper or the like and the whole stapled or otherwise united to provide a unitary packet, as seen in Fig. 38, from which each individual match can be conveniently withdrawn. Obviously the filled holder as produced by the machine, whether the folds of the holder be fastened or not, may be contained in a suitable flat metal case which can be conveniently carried in the user's pocket.

In Figs. 39 to 44, inclusive, of the drawings I have illustrated a machine embodying modifications of various mechanisms hereinbefore described, and including means whereby preformed match splints are inserted in the partially formed holder within the matrix preparatory to the completion of the holder and its delivery to the match conveyer.

In this modified construction the slitting and forming rolls 55 and 60, respectively, and the actuating mechanism therefor are omitted, and in lieu thereof match splint feeding mechanism of the general character set out in my pending application Serial No. 622,061, filed July 12, 1932, is substituted, this application having matured into Patent Number 1,992,522, dated Feb. 26, 1935.

The splint feeding mechanism herein illustrated comprises a splint containing hopper or magazine 294 overlying a transverse bed 295 which is supported at its ends on a pair of pedestals on the main frame of the machine. The upper surface of the bed 295 is formed with spaced parallel splint receiving grooves 296 extending longitudinally of the machine, such grooves corresponding in number and spaced relation with a row of perforations in a partially formed holder blank when the blank is seated in the matrix, and each groove being adapted to receive a single splint from the contents of the hopper.

At the right hand or rear edge of the bed 295 is the upper platform of a succession of similar platforms 297 which are arranged in descending or step-like order from the bed 295 to and under the forward end of a block 298 in which the holder matrix is formed. These platforms are fixedly supported by a pair of longitudinally extending parallel frame-pieces 299 which are fastened on an underlying extension of the longitudinal trough structure 94. The upper surfaces of the respective platforms are formed with parallel splint receiving grooves corresponding in number and relation with each other and with the grooves of the hopper bed 295, and means are provided whereby each succeeding row of splints in such bed is ejected lengthwise therefrom and deposited in the grooves of the uppermost platform and thence similarly projected to and from the grooves of the platforms in succession until they are deposited in the grooves of the lowermost platform, whence they are entered in the opposing perforations in the up-standing sides of the partially formed holder which is seated in the matrix.

The means herein illustrated for successively impelling the matches in their travel from the hopper to the partially formed holder comprises a series of horizontal rods 300 slidable in and longitudinally of the grooves of the bed, and similar series of rods 301 slidable in the grooves of the respective platforms, the rods of the respective series being affixed in descending planes to a step-like longitudinally reciprocative plunger 302 which is slidably mounted in longitudinal guideways 303 in the frame pieces 299. (See Figs. 39 and 40.)

The plunger 302 is connected by a cross-shaft 304 to upstanding lugs 305 on an extension 306 of the slide plate 233 which actuates the succession of holder feeding dogs 223, such extension being provided with a rack-bar 307 in mesh with a sector gear 308 on a rock-shaft 309 having its bearings in brackets 310 on the main supporting frame. Fast on this rock-shaft is a depending arm 311 having a roll 312 operatively fitted in a suitable race of a barrel cam 313 fast on the drive shaft 53, and hence during the rotation of the cam 313 the timely reciprocation of the slide and plunger are effected.

In this modified construction the punch mechanism for forming the rows of perforations in the web X on the table 127 is illustrated as located between the web severing and feeding rolls and the blank severing cutter blade 169; it being noted that the punches 160 on the head 161 are circular in cross-section to produce perforations in the web corresponding with the cross-section of the splints. Two sets of associated scoring and feeding rolls, 129 and 130, respectively, are illustrated, the shaft of the upper scoring roll being geared with the shaft of the lower feeding roll, and the latter shaft carrying the pawl and ratchet mechanism for intermittently rotating the rolls.

The actuating rod 144 for the pawl mounting is connected at its lower end with a rock-arm 314 which is pivoted on a bracket 315 at one side of the main frame and which arm is provided with a roller 316 in contact with the periphery of a cam 317 fast on the drive shaft.

The rod 165 for actuating the punch head 161 is connected at its lower end with a rock-arm 318 which is pivoted on a bracket 319 at one side of the main frame and similarly to the arm 314 is provided with a roller 320 in registry with the race of a face cam 321 fast on the main shaft.

As each succeeding holder blank is severed from the free end of the web X by the transverse cutter 169, such blank is engaged by a pair of intermittently rotatable feed-rolls 322 located rearward of and at the respective sides of the matrix, which rolls in each succeeding movement of the web co-operate therewith to position the preceding blank over the matrix. These rolls 322 are fast on a shaft 323 having its bearings in the matrix block 298. One end of the shaft 323 projects beyond the block and is provided with a pinion 324 in mesh with a vertically movable rack-bar 325 which is connected by means of a link 326 with a rock-arm 327 which is pivoted on a bracket 328 at one side of the main frame and is provided with a roller 329 in registry with the race of a face cam 330 fast on the main shaft.

The means illustrated for periodically actuating the cutter 169 comprises a pair of parallel arms 331 which are pivoted at their forward ends to a vertically reciprocative head 332 carrying the cutter blade, which arms are fast at their rear ends on a transverse shaft 333 having its bearings on the supporting frames for the scoring and feeding rolls. One end of the shaft 333 projects outward and has fastened thereto an arm 334 which is connected by means of a link 335 with a rock-arm 336 pivoted on a bracket 337 at one side of the main frame and having a roller 338 in registry with the race of a face cam 339 fast on the main shaft.

In this modified construction the blank depressing plunger 104 which is guided in the housing 121 is provided with a spring pressed foot 340 comprising a cross-member slidably fitted on the lower end of the plunger, and normally depressed upon underlying stops 341 on the sides of the plunger by means of vertical compression springs 342 interposed between the foot and the housing. In the down stroke of the plunger 104 the pressure foot initially bears resiliently upon the marginal portions of the holder blank seated over the matrix, thus preventing displacement of the blank, and in the continued descent of the plunger it moves freely through the pressure foot and forces the blank into the matrix so as to bend up the sides of the blank with the perforations of the respective up-turned sides in alinement to receive the splints as they are projected from the lowermost platform 297 of the splint feeding mechanism, as previously described.

The plunger 104 is illustrated as pivotally connected to one arm 343 of a rock-lever whereof the other arm 344 is connected by means of a rod 345 with a pivoted link 346 on one end of a rock-arm 347 which is pivoted at its opposite end on a bracket 348 on the under side of the main frame. This rock-arm has a suitably-disposed roll 349 thereon in registry with the race of a face cam 350 fast on the main shaft, the contour of the race being such that the rock-arm and its connections with the plunger are actuated to effect the requisite reciprocation of the plunger.

In this modified construction is employed an oscillatory, instead of a reciprocating folder for the forward up-standing side of the partially formed holder in the matrix. The oscillating folder 351 is mounted on a rock-shaft 352 extending longitudinally of and within a recess in the forward wall of the matrix throat, one end of the shaft projecting outwardly and having fast thereon a pinion 353 in mesh with the upper end of a depending rack bar 354. The lower end of this bar is pivoted to one end of a horizontal rock-arm 355 which, in turn, is pivoted at its opposite end on a hanger 356 at the adjacent side of the main frame. This rock-arm has a lateral roll 357 in registry with the race of a face cam 358 fast on the drive shaft 53, the contour of the cam race being such that the rock-arm and its connections are operated to oscillate the folder 351 in timed relation with the associated holder forming and splint inserting mechanisms.

It is to be understood that my invention is not limited to the particular structures and mechanisms herein disclosed as the same may be variously modified within the principle of the invention and the scope of the appended claims.

I claim:—

1. The combination with means for forming a holder from sheet material, of means for assembling match splints in and transversely of the said holder and with the ends of the splints projecting beyond the respective sides of the holder, a conveyer having a portion movable at right angles to the path of the filled holder, means moving the splint filled holder in a direction longitudinally of the contained splints and transferring it to the conveyer with the ends of the splints projecting beyond the path of the conveyer, and means for applying head composition to the assembled splints as they progress with the conveyer.

2. The combination of a matrix, means for successively feeding to the matrix holder blanks of sheet material having in their side portions longitudinally extending rows of perforations, a former plunger, means for intermittently moving said plunger down to two succeeding levels into the matrix and then raising the plunger above the matrix, said plunger in its down stroke to the first level partially depressing the opposing blank into the matrix and thereby bending up the perforated side portions of the blank, means for feeding splint strips across the matrix and through the perforated sides of the partially depressed blank, means for severing the strips in a plane adjacent the matrix to provide a row of match splints supported in the up-standing sides of the blank, said splints and the blank being depressed through the matrix in the continued down stroke of the plunger to the second level, means for folding the up-standing sides of the blank in overlapping relation upon the match splints to form a flat tubular holder for the splints, and means for removing the filled holder.

3. The combination of a matrix, means for successively feeding to the matrix holder blanks of sheet material having in their side portions longitudinally extending rows of perforations, a former plunger, means for intermittently moving said plunger down into the matrix and then raising the plunger above the matrix, said plunger in its initial down stroke partially depressing the opposing blank into the matrix and thereby bending up the perforated side portions of the blank, means for feeding splint strips across the matrix and through the perforated sides of the partially depressed blank, means for severing the strips in a plane adjacent the matrix to provide a row of match splints supported in the upstanding sides of the blank, said splints and the blank being depressed through the matrix in the continued down stroke of the plunger, means for folding the up-standing sides of the blank in overlapping relation upon the match splints to form a flat tubular holder for the splints, a conveyer, means for transferring the filled holder to the conveyer with the ends of the splints projecting beyond the path of the conveyer, and means for applying head composition to the splints as they progress with the conveyer.

4. The combination with means for feeding a web of sheet material and for longitudinally slitting the web into splint strips, of a matrix in the path of the leading ends of the strips, means for successively feeding to the matrix holder blanks having in their side portions longitudinally extending rows of perforations, a former plunger, means for intermittently moving said plunger down into the matrix and then raising the plunger above the matrix, said plunger in its initial down stroke partially depressing the opposing blank into the matrix and thereby bending up the perforated side portions of the blank with the perforations positioned to receive the leading ends of the splint strips, means for severing the strips in a plane adjacent the matrix to provide a row of match splints supported in the upstanding sides of the blank, said plunger in its continued down stroke depressing the assembled splints and the blank through the matrix, means for folding the up-standing sides of the blank in overlapping relation upon the match splints to form a flat tubular holder for the splints, and means for removing the filled holder.

5. The combination with means for feeding a web of sheet material and for longitudinally slitting the web into splint strips, of guide means for spacing the leading ends of the respective strips and partially turning them from a horizontal to a vertical position, a matrix in the path of the leading ends of the strips, means for successively feeding to the matrix holder blanks having in their side portions longitudinally extending rows of perforations, a former plunger, means for intermittently moving said plunger down into the matrix and then raising the plunger above the matrix, said plunger in its initial down stroke partially depressing the opposing blank into the matrix and thereby bending up the perforated side portions of the blank with the perforations positioned to receive the leading ends of the splint strips, means for severing the strips in a plane adjacent the matrix to provide a row of match splints supported in the upstanding sides of the blank, said plunger in its continued down stroke depressing the assembled splints and the blank through the matrix, means for folding the up-standing sides of the blank in overlapping relation upon the match splints to form a flat tubular holder for the splints, and means for removing the filled holder.

6. The combination with means for feeding a web of sheet material, of means for longitudinally slitting the web into splint strips, feeding and compression means for the splint strips, means for applying wax to the surfaces of the strips where they are compressed, a matrix in the path of the leading ends of the strips, means for successively feeding to the matrix holder blanks having in their side portions longitudinally extending rows of perforations, a former plunger, means for intermittently moving said plunger down into the matrix, said plunger in its initial down stroke partially depressing the opposing blank into the matrix and thereby bending up the perforated side portions of the blank with the perforations positioned to receive the leading ends of the splint strips, means for severing the strips in a plane adjacent the matrix to provide a row of match splints supported in the upstanding sides of the blank, said plunger in its continued down stroke depressing the assembled splints and the blank through the matrix, means for folding the up-standing sides of the blank in overlapping relation upon the match splints to form a flat tubular holder for the splints, and means for removing the filled holder.

7. The combination with means for feeding a web of sheet material and for longitudinally slitting the web into splint strips, of guide means for spacing the leading ends of the respective strips and partially turning them at right angles to the normal plane of the strips, means for supporting a splint holder element in the path of the leading ends of the strips, and means for severing the leading ends of the strips in a plane adjacent the holder to provide a row of match splints assembled and supported in the holder with the ends of the splints projecting outwardly beyond the respective sides of the holder.

8. The combination with means for feeding a web of sheet material and for longitudinally slitting the web into splint strips, of guide means for spacing the leading ends of the respective strips and partially turning them at right angles to the normal plane of the strips, means for partially forming a splint holder having up-standing sides with rows of perforations in line with the leading ends of the respective strips, whereby such strips enter the perforations and extend transversely of the holder, means for severing the splint strips in a plane adjacent the holder to provide an assembled row of match splints, and means for folding the holder sides in overlapping relation upon the row of splints.

9. The combination of feeding and compressing rolls for splint strips, a wax supply tank having a heating extension in close relation to and partially encasing the peripheral surface of a roll, and absorbent material supported independently of but in contactual relation to said surface, said tank having a feed passage from the interior thereof to said absorbent material.

10. The combination of a pair of feeding and compressing rolls for splint strips, wax supply tanks in proximity to the respective rolls and having heating extensions positioned in close relation to the upper and lower peripheral surfaces of the respective rolls, and absorbent material supported independently of but in contactual relation to the said surfaces, said tanks having feed passages from the interior thereof to the respective absorbent material.

11. The combination with a matrix, a vertically reciprocative former plunger, and means for intermittently moving the plunger down to two succeeding levels in the matrix and then raising the plunger above the matrix, of means for intermittently feeding a web of sheet material and progressively forming spaced parallel rows of perforations in and longitudinally of the web, means for successively severing holder blanks from the leading end of the web, means for feeding each succeeding blank in the path of the plunger so that in the initial descent of the plunger upon the blank the blank is partially entered in the matrix and the perforated sides of the blank are bent upward, means for assembling a row of match splints in and transversely of the blank with the ends of the splints projecting through and beyond the respective sides of the blank so that in the continued descent of the plunger such row of matches and the blank are depressed through the matrix.

12. The combination with a matrix, a vertically reciprocative former plunger, and means for intermittently moving the plunger down to two succeeding levels in the matrix and then raising the plunger above the matrix, of means for intermittently feeding a web of sheet material and progressively forming spaced parallel rows of perforations in and longitudinally of the web, means for successively severing holder blanks from the leading end of the web, means for feeding each succeeding blank in the path of the plunger so that in the initial descent of the plunger upon the blank the blank is partially entered in the matrix and the perforated sides of the blank are bent upward, means for assembling a row of match splints in and transversely of the blank with the ends of the splints projecting through and beyond the respective sides of the blank so that in the continued descent of the plunger such row of matches and the blank are depressed through the matrix, folders at the foot of the matrix for folding the up-standing sides of the blank in overlapping relation upon the splints, and means for operating the plunger and the folders in timed relation.

13. The combination with a matrix having vertically slotted side walls, a vertically reciprocative former plunger, and means for intermittently moving the plunger down to two succeeding levels in the matrix and then raising the plunger above the matrix, of means for successively feeding in the path of the plunger blanks of sheet material each having spaced parallel rows of perforations so arranged that in the initial downward movement of the plunger to press the blank into the matrix the perforated side portions of the blank are bent upward, and means for assembling a row of match splints in and transversely of the blank with the ends of the splints projecting through and beyond the respective upstanding sides of the blank so that in the continued down stroke of the plunger such row of matches and the blank are depressed through the matrix while the projecting ends of the splints pass freely through the slots of the respective side walls of the matrix.

14. The combination with a matrix having vertically slotted side walls, a vertically reciprocative former plunger, and means for intermittently moving the plunger down to two succeeding levels in the matrix and then raising the plunger above the matrix, of means for successively feeding in the path of the plunger blanks of sheet material each having spaced parallel rows of perforations so arranged that in the initial downward movement of the plunger to press the blank into the matrix the perforated side portions of the blank are bent upward, means for assembling a row of match splints in and transversely of the blank with the ends of the splints projecting through and beyond the respective up-standing sides of the blank so that in the continued down stroke of the plunger such row of matches and the blank are depressed through the matrix while the projecting ends of the splints pass freely through the slots of the respective side walls of the matrix, and means for folding the up-standing sides of the blank in overlapping relation upon the splints.

15. The combination with a matrix having a fixed vertically slotted side wall, a reciprocative folder member having a similarly slotted acting portion constituting the opposite side wall of the matrix, of a vertically-reciprocable former plunger, means for intermittently moving the plunger down to two succeeding levels in the matrix and then raising the plunger above the matrix, means for successively feeding in the path of the plunger blanks of sheet material ach having spaced parallel rows of perforations so arranged that in the initial downward movement of the plunger to press the blank into the matrix the perforated side portions of the blank are bent upward, means for assembling a row of match splints in and transversely of the blank with the ends of the splints projecting through and beyond the respective perforated sides of the blank, so that in the continued down stroke of the plunger such row of matches and the blank are depressed through the matrix while the projecting ends of the splints pass freely through the slots of the respective side walls of the matrix, a folder member at the fixed slotted wall of the matrix, and means for operating the two folder members in timed relation so as to fold the upstanding sides of the blank in overlapping relation upon the splints.

16. The combination with means for assembling splints in packet form, and a conveyer to which the packets are successively delivered, of a packet support between the splint assembling means and the conveyer, and means for feeding the packets in spaced relation along the said support and to the conveyer, said feeding means comprising a succession of pivoted dogs, pivot bearing members for the respective dogs, and means for reciprocating said members and their dogs toward and from the conveyer and also vibrating the dogs into and from the path of travel of the packets on the packet support.

17. The combination with means for assembling splints in packet form, and a conveyer to which the packets are successively delivered, of a packet support between the splint assembling means and the conveyer, and means for feeding the packets in spaced relation along the said support and to the conveyer, said feeding means comprising a succession of pivoted dogs each including an upper pusher portion and a lower rocker portion, the latter having its axis spaced below and offset from the pivotal axis of the dog, bearing members for the pivots of said dogs, a longitudinal support for said bearing members, a reciprocative element in which the rocker portions of the respective dogs are mounted, and means for reciprocating said element toward and from the conveyer.

18. The combination with means for assembling splints in packet form, and a conveyer to which the packets are successively delivered, of a packet support between the splint assembling means and the conveyer, said support having a longitudinal opening interrupted at regular intervals by transverse slots in the support, and means for feeding the packets in spaced relation along the said support and to the conveyer, said feeding means comprising a succession of pivoted dogs corresponding in number with the transverse slots of the longitudinal opening in the packet support, each dog including an upper cross-bar movable into and from adjacent transverse slots and a lower transverse rocker having its axis below and offset from the pivotal axis of the dog, pivot bearing members for the respective dogs, a longitudinal support for said bearing members, a reciprocative element in which the rockers of the respective dogs are mounted, and means for reciprocating said element toward and from the conveyer.

JOSEPH C. DONNELLY.